US011076426B2

(12) United States Patent
An et al.

(10) Patent No.: US 11,076,426 B2
(45) Date of Patent: Jul. 27, 2021

(54) BASE STATION AND METHOD FOR CONTROLLING SAME IN WIRELESS COMMUNICATION SYSTEM

(71) Applicant: Samsung Electronics Co., Ltd., Suwon-si (KR)

(72) Inventors: Chanho An, Seoul (KR); Seungjoo Maeng, Seongnam-si (KR); Seunghee Han, Suwon-si (KR); Joseph Jeon, Seongnam-si (KR); Jeewoong Kang, Seoul (KR); Younjung Kim, Seoul (KR); Jinyoung Oh, Seoul (KR); Myounghee Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,430

(22) PCT Filed: Jan. 5, 2018

(86) PCT No.: PCT/KR2018/000299
§ 371 (c)(1),
(2) Date: Jul. 8, 2019

(87) PCT Pub. No.: WO2018/131845
PCT Pub. Date: Jul. 19, 2018

(65) Prior Publication Data
US 2019/0380150 A1 Dec. 12, 2019

(30) Foreign Application Priority Data
Jan. 13, 2017 (KR) ........................ 10-2017-0006304

(51) Int. Cl.
H04W 74/08 (2009.01)
H04W 88/08 (2009.01)

(52) U.S. Cl.
CPC ........ *H04W 74/0816* (2013.01); *H04W 88/08* (2013.01)

(58) Field of Classification Search
CPC ......... H04W 74/0816; H04W 74/0808; H04W 74/0825; H04W 74/085; H04W 74/0858;
(Continued)

(56) References Cited

U.S. PATENT DOCUMENTS

2011/0128895 A1 6/2011 Sadek et al.
2014/0341207 A1 11/2014 Bhushan et al.
(Continued)

FOREIGN PATENT DOCUMENTS

KR 10-2016-0121406 A 10/2016
WO 2016/048798 A1 3/2016
(Continued)

OTHER PUBLICATIONS

Partial Supplementary European Search Report dated Nov. 11, 2019, issued in European Application No. 18738765.9.

*Primary Examiner* — Candal Elpenord
(74) *Attorney, Agent, or Firm* — Jefferson IP Law, LLP

(57) ABSTRACT

The present disclosure relates to a communication technique and system thereof that fuse a 5G communication system with IoT technology for supporting a higher data rate than a 4G system. The present disclosure may be applied to intelligent services (e.g., smart homes, smart buildings, smart cities, smart cars or connected cars, healthcare, digital education, retail, security and safety related services, etc.) on the basis of 5G communication technology and IoT related technology. A method for controlling a base station according to one embodiment of the present invention may comprise the steps of: generating a first packet including data to be transmitted to a terminal on an unlicensed band; determining whether a channel sensing for using the unlicensed
(Continued)

band is completed when the generation of the first packet is completed; and as a result of the determination, when the channel sensing for using the unlicensed band is not completed, omitting a transmission of the first packet.

10 Claims, 19 Drawing Sheets

(58) Field of Classification Search
CPC .................. H04W 74/08191; H04W 74/08; H04W 88/08
See application file for complete search history.

(56) References Cited

U.S. PATENT DOCUMENTS

| | | |
|---|---|---|
| 2015/0049715 A1 | 2/2015 | Yerramalli et al. |
| 2015/0055541 A1 | 2/2015 | Zhang et al. |
| 2015/0055589 A1 | 2/2015 | Yerramalli et al. |
| 2015/0223075 A1 | 8/2015 | Bashar et al. |
| 2015/0365931 A1 | 12/2015 | Ng et al. |
| 2015/0382374 A1 | 12/2015 | Bhorkar et al. |
| 2016/0057770 A1* | 2/2016 | Yerramalli ............ H04L 5/0007 370/329 |
| 2016/0309512 A1 | 10/2016 | Li et al. |
| 2017/0013469 A1 | 1/2017 | Larsson et al. |
| 2017/0055296 A1 | 2/2017 | Cheng et al. |
| 2017/0079032 A1* | 3/2017 | Li ..................... H04W 72/0453 |
| 2018/0007710 A1* | 1/2018 | Tanaka .............. H04W 72/1278 |
| 2018/0124749 A1 | 5/2018 | Park et al. |
| 2018/0213563 A1* | 7/2018 | Yang .................... H04W 72/12 |
| 2018/0227082 A1* | 8/2018 | Harada ................. H04L 1/1812 |
| 2018/0242357 A1* | 8/2018 | Khirallah ............. H04L 5/0053 |
| 2018/0332478 A1* | 11/2018 | Noh ..................... H04L 5/0053 |

FOREIGN PATENT DOCUMENTS

| | | |
|---|---|---|
| WO | 2016/148622 A1 | 9/2016 |
| WO | 2016/148632 A1 | 9/2016 |

* cited by examiner

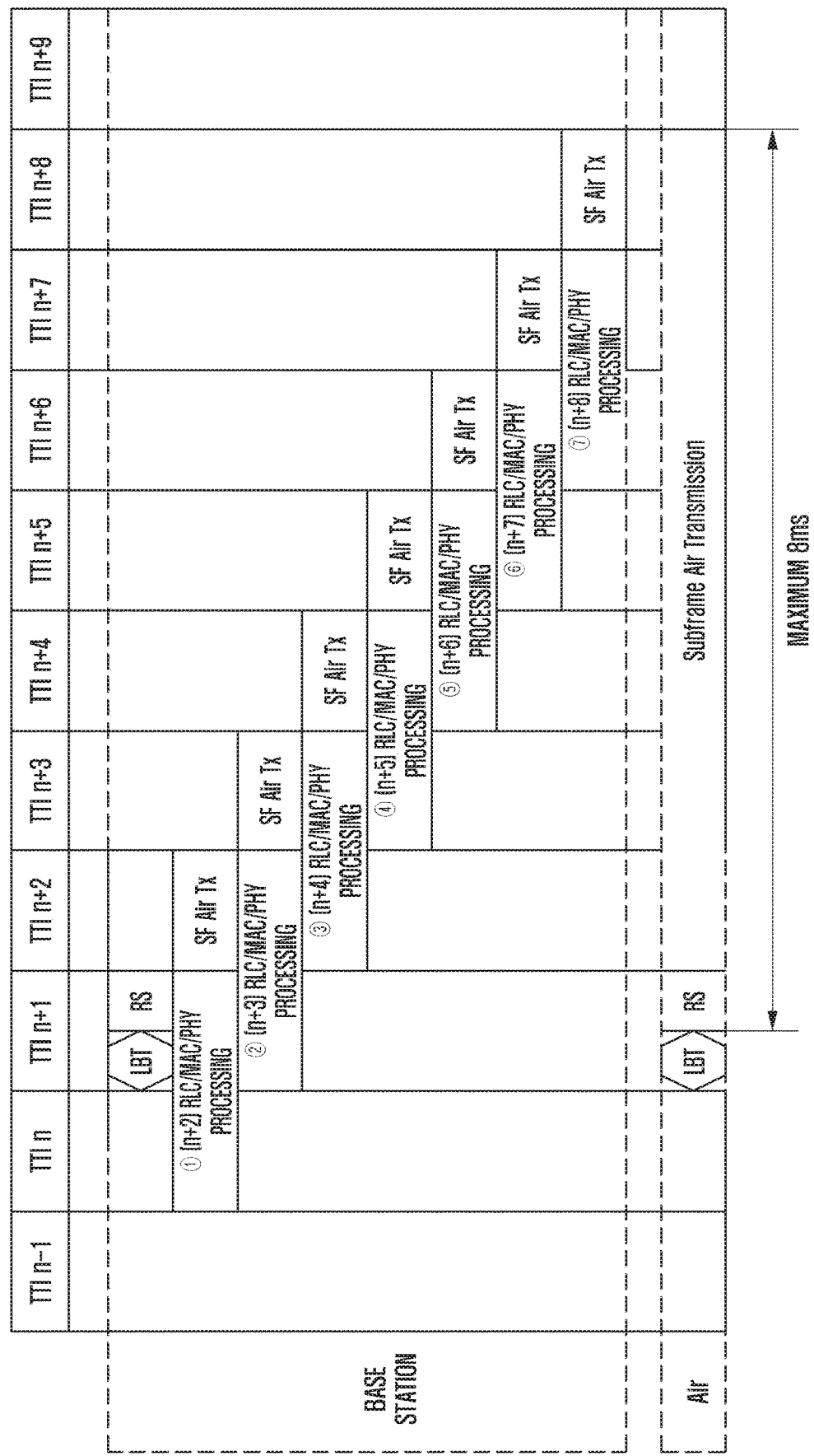

BASE STATION AND METHOD FOR CONTROLLING SAME IN WIRELESS COMMUNICATION SYSTEM

TECHNICAL FIELD

The disclosure relates to a wireless communication system and, more particularly, to a base station that occupies an unlicensed band and transmits a data packet in the unlicensed band and a control method therefor.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

To achieve higher data rates, 5G communication systems consider utilization of the mmWave band (e.g., 60GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, when devices occupy an unlicensed band and transmit data packets over the unlicensed band, there is a need for a method to increase the transmission efficiency.

DISCLOSURE OF INVENTION

Technical Problem

The disclosure has been made in view of the above need. Accordingly, the disclosure is to provide a method and apparatus that, when devices transmit data packets over an unlicensed band in a wireless communication system, can maximize packet transmission efficiency during the maximum occupancy time including the time to perform channel sensing such as LBT (listen before talk) and the time to transmit a reserved signal.

Solution to Problem

According to an embodiment of the disclosure, there is provided a method for controlling by a base station in a wireless communication system. The control method may include: generating a first packet including data to be transmitted to a terminal on an unlicensed band; determining, after generation of the first packet, whether channel sensing for using the unlicensed band is completed; and skipping a transmission of the first packet, in case that the channel sensing for using the unlicensed band is not completed.

According to an embodiment of the disclosure, a base station is provided. The base station may include: a transceiver configured to transmit and receive signals; and a controller. The controller may be configured to: generate a first packet including data to be transmitted to a terminal on an unlicensed band; determine, after generation of the first packet, whether channel sensing for using the unlicensed band is completed; and control the transceiver to skip a transmission of the first packet, in case that the channel sensing for using the unlicensed band is not completed.

Advantageous Effects of Invention

According to an embodiment of the disclosure, when a device transmits a data packet over an unlicensed band, the transmission efficiency can be increased.

BRIEF DESCRIPTION OF DRAWINGS

FIGS. 1A to 1F illustrate schemes for channel sensing in an unlicensed band and packet transmission after channel sensing according to an embodiment of the disclosure.

MODE FOR THE INVENTION

Figure 1A:
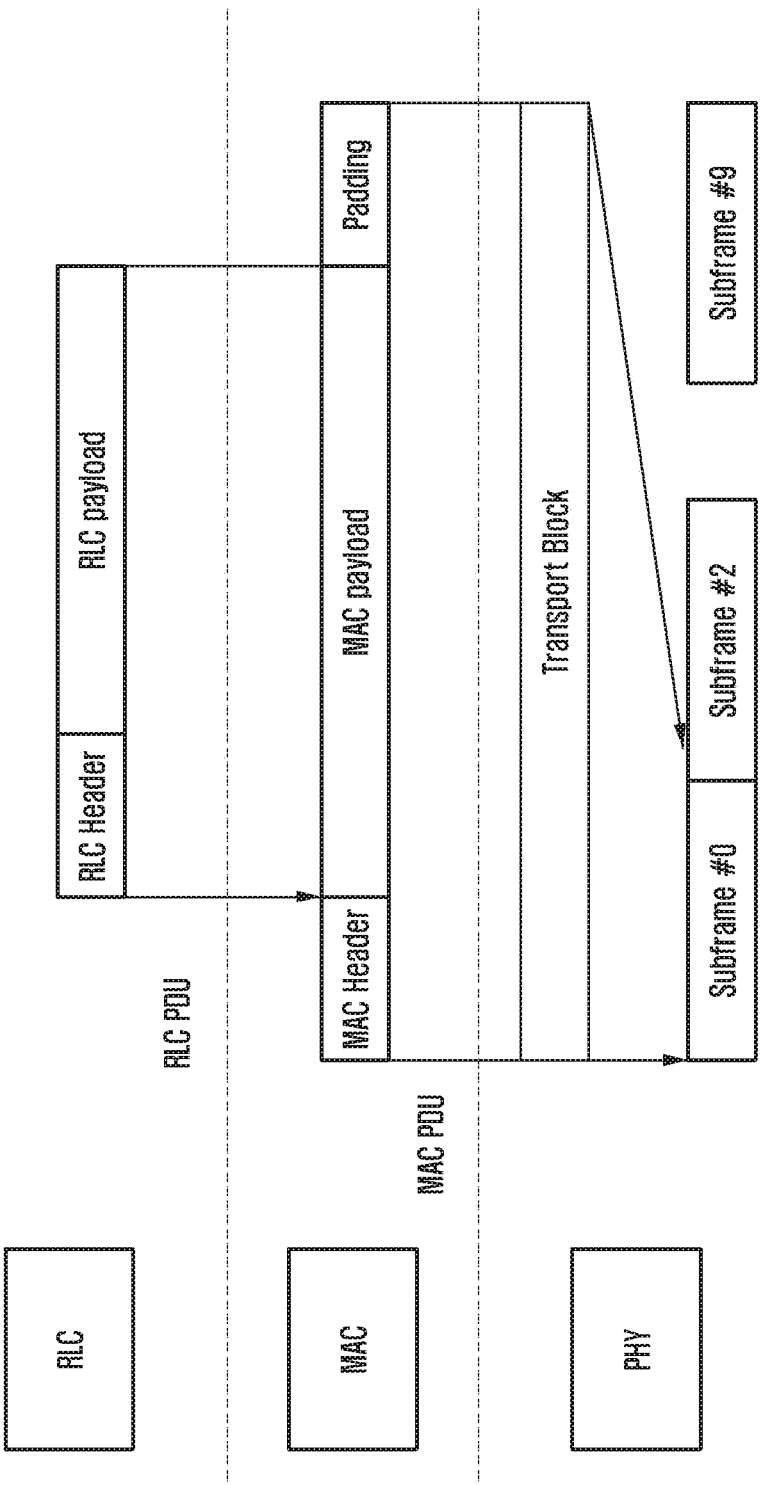

Hereinafter, embodiments of the disclosure are described in detail with reference to the accompanying drawings. Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

In the description, the terminal can generally include a mobile terminal and can indicate a device that is subscribed to a mobile communication system and receives a service from the mobile communication system. The mobile terminal may be, but not limited to, a smart device such as a smartphone or a tablet PC.

A communication device using an unlicensed band needs to perform channel sensing before transmitting a data packet in order to share a frequency channel with other devices. Channel sensing may be an operation of determining whether a wireless channel is being used by another device. For example, an LBT (listen before talk) technique may be used for channel sensing. The LBT technique is to identify whether the channel is being used by another device first before using the frequency channel and then transmit a communication signal when the channel is unused (idle) for a preset time.

The 3GPP Rel-13 licensed assisted access (LAA) specification is a standard for combining frequency resources in the licensed and unlicensed bands, and has introduced the LBT function in the unlicensed band.

To transmit data due to LBT, the channel should be sensed to be idle for a defer period $T_d$ and a random backoff time of 9 μs×N (times). The defer period $T_d$ may indicate a certain waiting time due to the radio delay and transmission priority. The range of $T_d$ and N (contention window (CW)) may vary according to the transmission priority of the data packet. The maximum channel occupancy time (MCOT) $T_{mcot}$ that can be continuously occupied by one LBT operation is regulated. For example, the maximum channel occupancy time can be variously determined according to the country and transmission priority. Table 1 illustrates values for transmission priority P, defer period $T_d$, CW range N, and channel occupancy time $T_{mcot}$ defined in the 3GPP standard.

TABLE 1

| A priority of a transmission (P) | A defer period (Td) | The maximum channel occupancy time Tmcot, p | A range of CW (CWp) |
|---|---|---|---|
| 1 | 25 us | 2 ms | {3, 7} |
| 2 | 25 us | 3 ms | {7, 15} |
| 3 | 43 us | 8 or 10 ms | {15, 31, 63} |
| 4 | 79 us | 8 or 10 ms | {15, 31, 63, 127, 255, 511, 1023} |

In Table 1, the maximum channel occupancy time of 10 ms may mean that the corresponding band is guaranteed not to be used by another technology for a long time. In Japan, it is prescribed to transmit for 4 ms after LBT operation and then transmit again for 4 ms if the channel is sensed to be idle for 34 μs. The CW value may be dynamically changed within the CW range according to the HARQ result.

In the LTE communication system, resources can be basically allocated in units of subframes of 1 ms. On the other hand, the unlicensed band LBT can operate in units of μs (microseconds). As the LAA base station cannot know the end point of LBT operation, the time synchronization between the PCell and the SCell may be misaligned. Hence, timing alignment may be required. For example, even if the channel is sensed to be idle as a result of LBT operation, the device wishing to transmit data in the unlicensed band may have to wait until the boundary of the next subframe to transmit data. Here, the device (e.g., base station) may transmit a reserved signal to prevent other devices from occupying the channel The time to send a reserved signal is included in the maximum channel occupancy time of the device.

Therefore, in the 3GPP Rel-13 LAA standard, frame structure type 3 is introduced to shorten the time to transmit a reserved signal and increase the efficiency of the maximum channel occupancy time. In frame structure type 3, data transmission can be started on a slot basis. For example, data transmission can also be started in the second slot. Also, in frame structure type 3, data transmission can be ended on a symbol basis. For example, in the last subframe of data transmission, the transmission may be ended at {3, 6, 9, 10, 11, 12} symbols.

Meanwhile, in 3GPP Rel-13 LAA, after successful LBT operation, the device should wait for transmission until the next subframe or slot boundary by sending a reserved signal. In addition, after successful LBT operation, several milliseconds may be additionally required depending on the processing of data. Specifically, as shown in FIG. 1A, it may additionally take a few milliseconds to process the data received from the higher layer through the RLC layer, the MAC layer, and the PHY layer and to transmit the processed data via a radio channel.

Figure 1B:
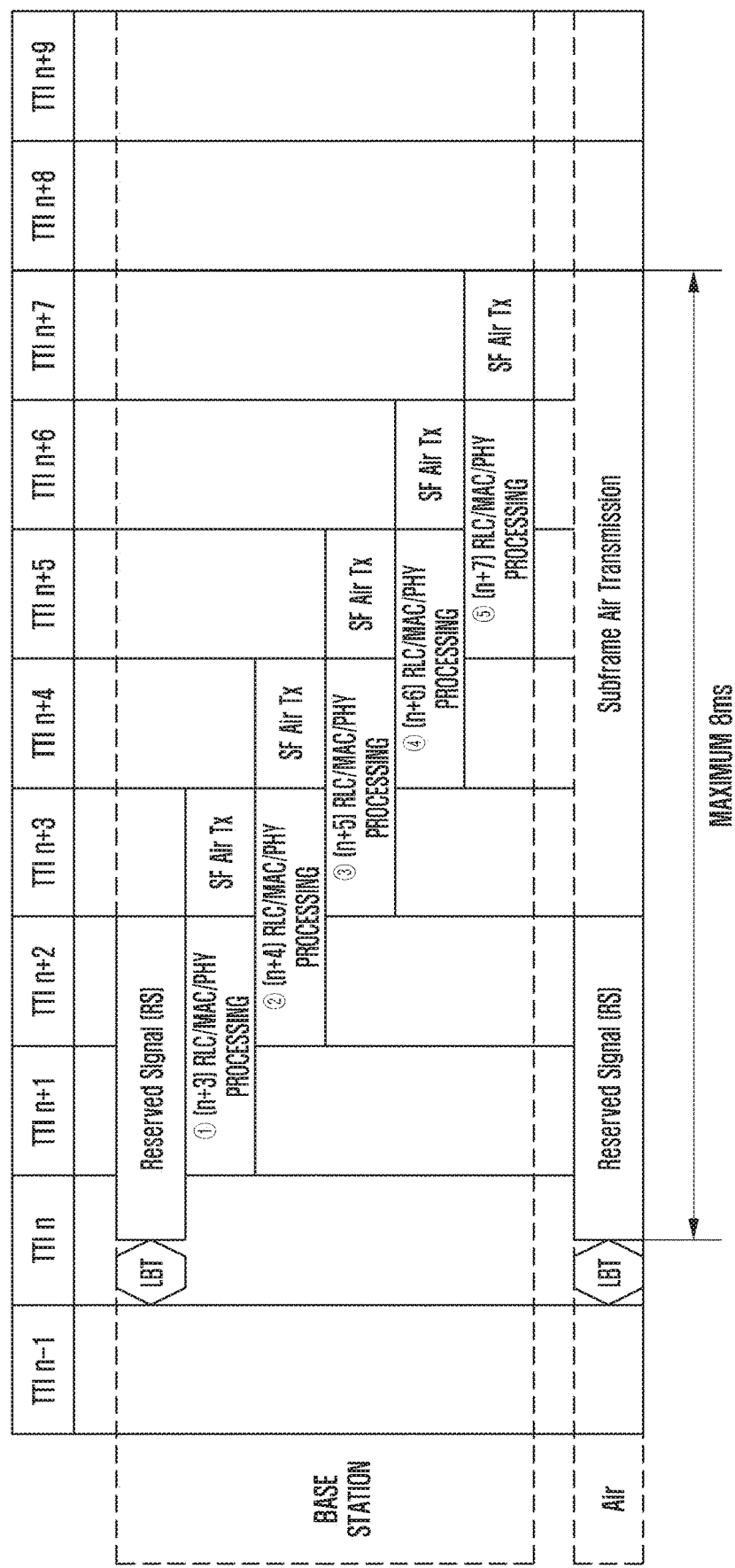

FIG. 1B depicts data transmission in an unlicensed band, including a process in which the device performs LBT operation and generates a packet containing transmission data.

FIG. 1B shows an example (without using frame structure type 3) when the RLC/MAC/PHY processing time to generate one data packet is about 2 ms and the transmission priority is 3 (p=3). As shown in FIG. 1B, as the device transmits a reserved signal during the time required to generate a packet, about 3 ms of the typical maximum channel occupancy time of 8 ms cannot be used for data transmission. In other words, the transmission opportunity during the same time is reduced compared with the licensed band (transmission efficiency=about 5/8).

Figure 1C:
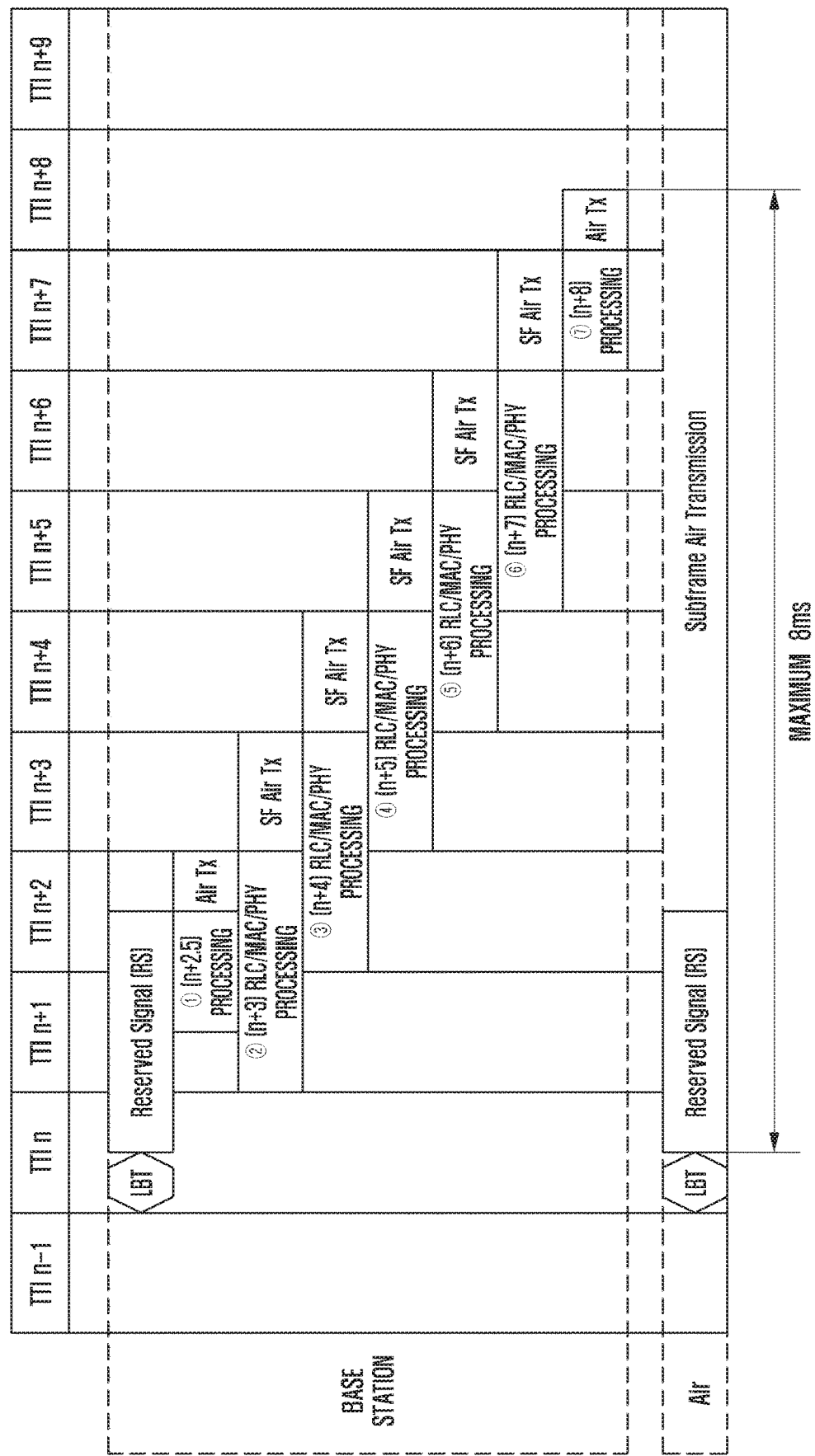

On the other hand, as shown in FIG. 1C, when RLC/MAC/PHY processing is performed through resource allocation on a slot basis and resources are allocated in units of symbols in the last subframe by using frame structure type 3, it is possible to increase the transmission opportunity by up to 0.86 ms. However, even in the example shown in FIG. 1C, the device cannot use about 2 ms for data transmission.

Figure 1D:
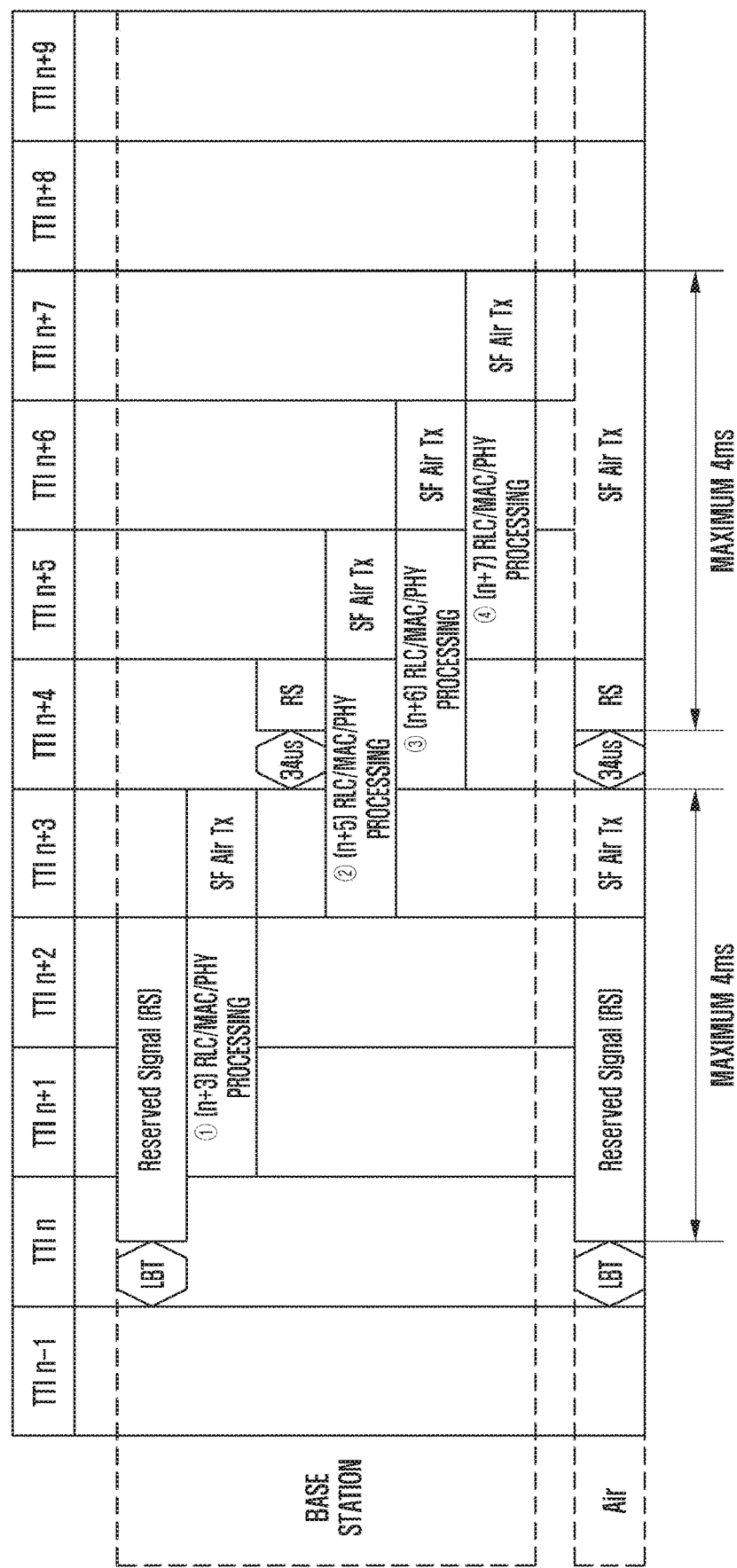

FIG. 1D depicts a situation in which the device performs LBT operation and transmits data in an unlicensed band when the channel occupancy time $T_{mcot}$ is limited to 4 ms.

For example, in Japan, the maximum channel occupancy time $T_{mcot}$ is limited to 4 ms. In this case, the device can transmit successively for up to 4 ms in the initial transmission after successful LBT, and transmit again for up to 4 ms if the channel is unused for 34 μs.

As shown in FIG. 1D, although the device has obtained a transmission opportunity of about 8 ms in one LBT operation, data transmission is possible for 4 ms (transmission efficiency=4/8). In this case, even if frame structure type 3 is used, the transmission opportunity will improve by about 1 ms.

Meanwhile, as shown in FIG. 1E, to increase the network resource efficiency (i.e., to improve the transmission opportunity), it is possible to prepare a data packet to be transmitted at a specific subframe first and to perform LBT operation at a time point close to the transmission time of the corresponding subframe. In this case, as the time to send a reserved signal can be reduced compared with the scheme shown in FIG. 1B or 1C, the transmission opportunity can be somewhat improved.

Figure 1F:
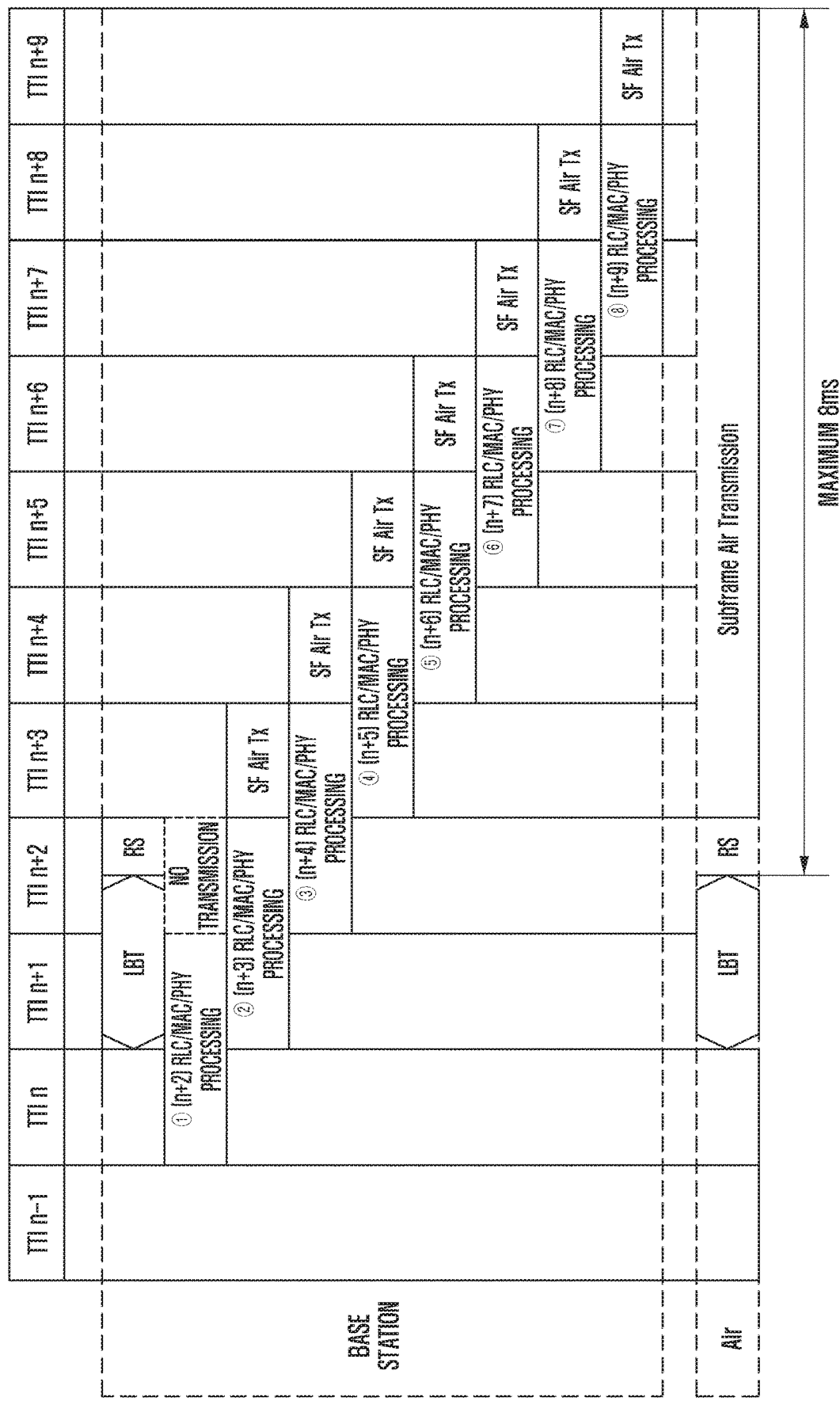

However, although the scheme shown in FIG. 1F is utilized, if another device uses the same band and LBT operation is delayed, it is not possible to transmit the packet ① prepared in anticipation of TTI (n+2) as shown in FIG. 1F. In this case, the terminal fails to receive the packet ① at TTI (n+2), and makes an ARQ retransmission request for the RLC PDU (protocol data unit) corresponding to the packet ① when the ARQ timer expires (e.g., several tens of ms). As a result, the user experience may deteriorate when the terminal has requested a small size or latency-sensitive packet.

To solve the problems described above, the disclosure proposes a method for improving the network transmission efficiency and transmission opportunity in an unlicensed frequency band.

For example, the disclosure can be applied to increase the efficient utilization of network resources when unlicensed frequency resources are used in combination with Rel-13 LAA. The disclosure can also be applied to techniques for combining unlicensed frequency resources such as LTE-U and Rel-14 eLAA, and to techniques utilizing unlicensed frequency resources independently such as MuLTEfire.

Figure 2:
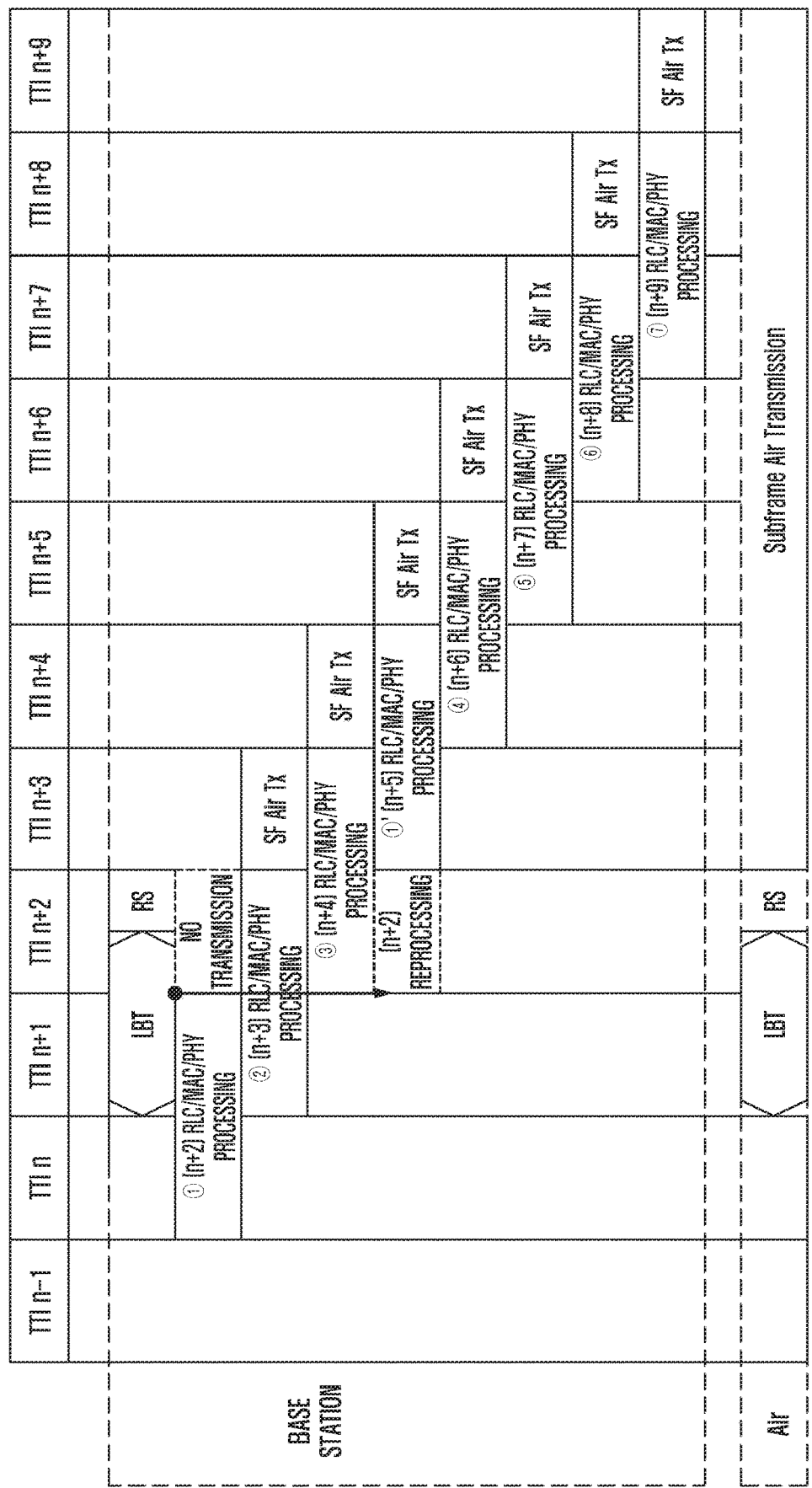
FIGS. 2 and 3 depict a packet transmission scheme in an unlicensed band according to embodiment 1 of the disclosure.

FIG. 2 depict a packet transmission scheme in an unlicensed band according to embodiment 1 of the disclosure.

Specifically, embodiment 1 of the disclosure is to improve the network transmission efficiency and transmission opportunity in an unlicensed frequency band, where the base station attempts LBT operation in accordance with the transmission time of a specific subframe.

In embodiment 1 of the disclosure, as shown in FIG. 2, the packet ① to be transmitted at TTI (n+2) may be generated from TTI (n). However, LBT operation starting at TTI (n+1) is delayed and the packet ① cannot be transmitted. Here, the base station can immediately know that the packet ① cannot be transmitted due to the LBT delay at TTI (n+2). Hence, the base station can immediately initiate a virtual feedback process to perform the retransmission procedure. Here, performing a virtual feedback process may mean that the base station assumes a specific feedback process for the packet that has not been transmitted due to the LBT delay and performs an ARQ or HARQ operation thereon. Performing the ARQ or HARQ operation will be described with reference to the following specific embodiments.

To be more specific, the base station can start at TTI (n) to generate a packet ① to be transmitted at TTI (n+2). The base station can start at TTI (n+1) to generate a packet ② to be transmitted at TTI (n+3). The base station can start at TTI (n+2) to generate a packet ③ to be transmitted at TTI (n+4).

However, if LBT operation starting from TTI (n+1) is delayed and the unlicensed frequency band is occupied from a specific point in the middle of TTI (n+2), to transmit a data packet on a subframe basis, the base station may transmit a reserved signal until TTI (n+2) ends.

Hence, the base station cannot transmit the generated packet ① at TTI (n+2). In this case, upon determining that LBT operation is not completed at TTI (n+2), the base station can determine that a NACK signal by the virtual feedback process has been received. As a result, the base station can reprocess the packet ① at TTI (n+2) and generate a packet ①' from TTI (n+3) so as to transmit the packet ① at TTI (n+5).

In addition, the base station can transmit at TTI (n+3) the packet ② generated for transmission at TTI (n+3), and transmit at TTI (n+4) the packet ③ generated for transmission at TTI (n+4). Then, the base station can transmit at TTI (n+5) the packet ①' generated for transmission at TTI (n+5).

Based on the scheme described above, the base station can regenerate and transmit the missing packet before receiving an ARQ retransmission request from the corresponding terminal receiving packets, thereby improving the transmission efficiency and the user experience.

As described in FIG. 2, upon determining that LBT operation is not completed at TTI (n+2), the base station may assume a feedback process for the corresponding packet and perform an ARQ/HARQ operation. For example, upon determining that LBT operation is not completed at TTI (n+2), the base station can determine to perform retransmission by using a virtual feedback process related to the corresponding packet.

Here, determining to perform retransmission using a virtual feedback process may be, for example, assuming that the base station has received a NACK signal from the corresponding terminal in a virtual feedback process. As another example, the base station may determine that the virtual feedback process is in a state such as DTX (discontinuous transmission), NACK/DTX, or no transmission.

As such, upon determining that a NACK signal by the virtual feedback process has been received, reprocessing of the packet ① can be performed immediately. Accordingly, the transmission efficiency in the unlicensed band can be improved and the user experience on the terminal can be improved.

Figure 3:
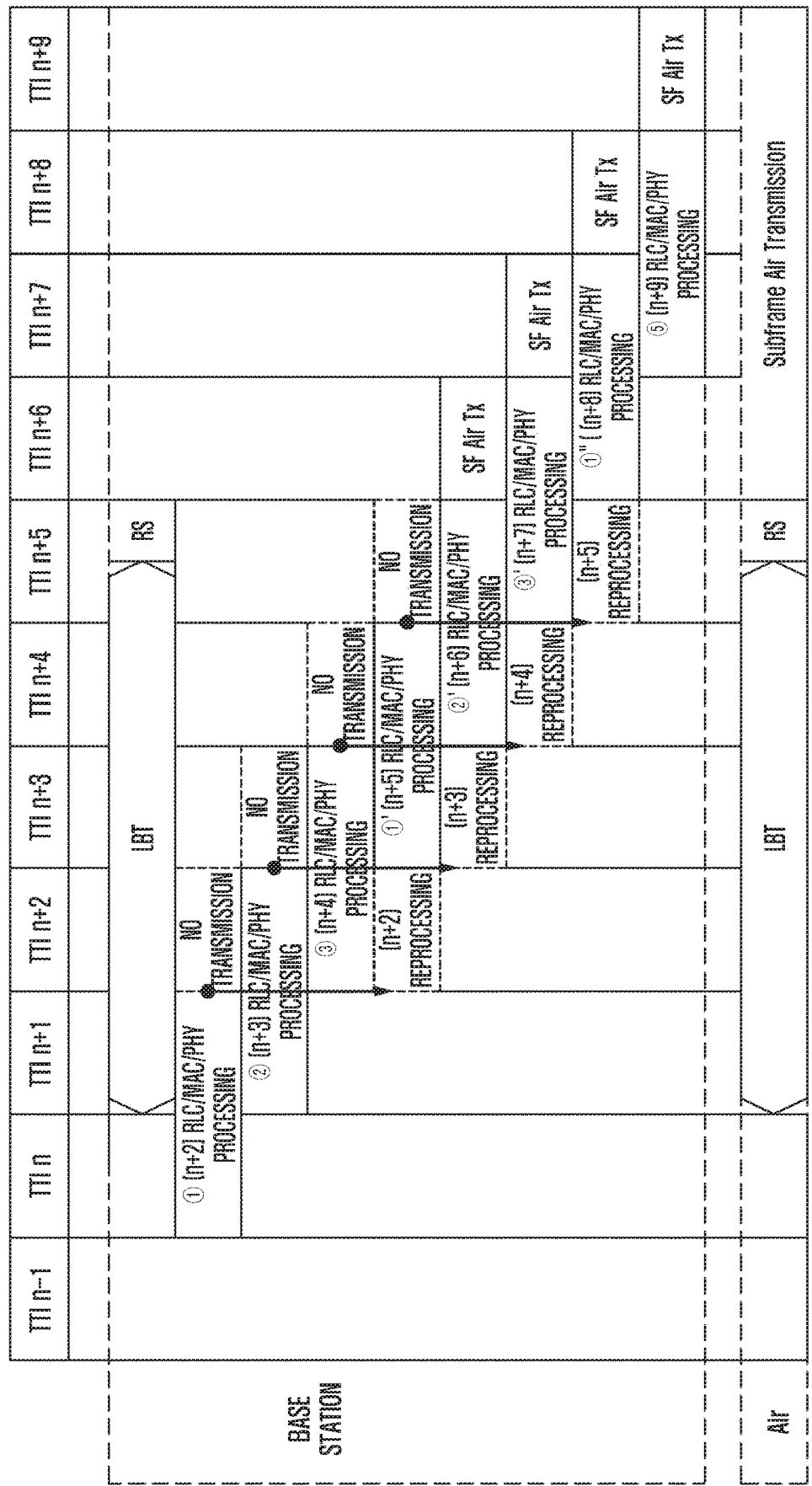

FIG. 3 depicts a variant of embodiment 1, where the delay of LBT operation is long. When LBT operation is performed from TTI (n+1) to the middle of TTI (n+5) as shown in FIG. 3, the base station cannot transmit the generated packet ① at TTI (n+2). In this case, upon determining that LBT operation is not completed at TTI (n+2), the base station can determine to perform retransmission using a virtual feedback process related to the corresponding packet. Here, determining to perform retransmission using a virtual feedback process may be assuming that the base station has received a NACK signal from the corresponding terminal in a virtual feedback process, or determining that the virtual feedback process is in a state such as DTX, NACK/DTX, or no transmission.

For example, upon determining that LBT operation is not completed at TTI (n+2), the base station can determine that a NACK signal is received in the virtual feedback process. Hence, the base station can reprocess the packet ① at TTI (n+2) and generate a packet ①' from TTI (n+3) so as to transmit the packet ① at TTI (n+5).

Additionally, the base station cannot transmit the generated packet ② and packet ③ respectively at TTI (n+3) and TTI (n+4) due to the delay of LBT operation. Hence, the base station can determine that a NACK signal by a virtual feedback process has been received respectively at TTI (n+3) and TTI (n+4). Upon determining that the NACK signal has been received, the base station can reprocess the packet ② at TTI (n+3) and generate a packet ②' from TTI (n+4) so as to transmit the packet ② at TTI (n+6). Then, the base station can reprocess the packet ③ at TTI (n+4) and generate a packet ①' from TTI (n+5) so as to transmit the packet ③ at TTI (n+7).

If the packet ①' generated via reprocessing for transmission at TTI (n+5) is not transmitted, the base station can again determine that a NACK signal by a virtual feedback process has been received. Then, the base station can reprocess the packet ①' at TTI (n+5) and generate a packet ①'' from TTI (n+6) so as to transmit the packet ①' at TTI (n+8).

In other words, the base station may continuously determine that a NACK signal by a virtual feedback process is received until LBT operation is completed. Here, as the base station does not transmit data during the LBT operation time, the terminal can determine that the transmission is started from TTI (n+6) where data is received for the first time.

Figure 4:
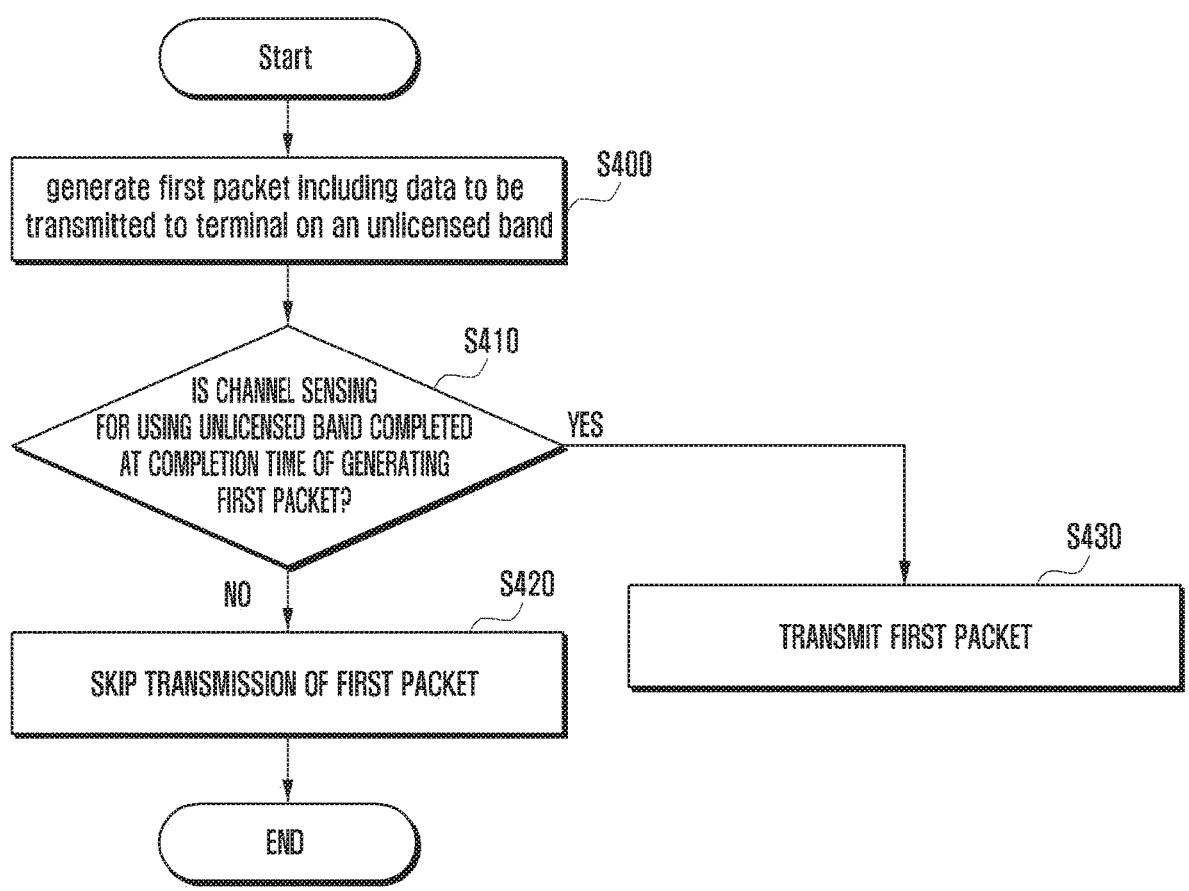
FIG. 4 is a flowchart of a packet transmission scheme in an unlicensed band according to embodiment 1 of the disclosure.

FIG. 4 is a flowchart of a packet transmission scheme in an unlicensed band according to embodiment 1 of the disclosure. At step S400, the base station may generate a first packet including data to be transmitted to the terminal in the unlicensed band. The first packet may be generated before or simultaneously with channel sensing for occupying the unlicensed band.

At step S410, the base station can determine whether channel sensing for using the unlicensed band is completed at the completion time of generating the first packet. Upon determining that channel sensing for using the unlicensed band is not completed at the completion time of generating the first packet, at step S420, the base station may omit transmission of the first packet. Specifically, upon determining that channel sensing is not completed at the completion time of generating the first packet, the base station may determine to initiate retransmission using a virtual feedback process (e.g., the base station may determine that a NACK signal is received from the terminal in the corresponding feedback process). Hence, the base station can continuously reprocess the packet ① and generate a packet ①'.

Upon determining that channel sensing for using the unlicensed band is completed at the completion time of generating the first packet, at step S430, the base station may transmit the first packet.

Figure 5:
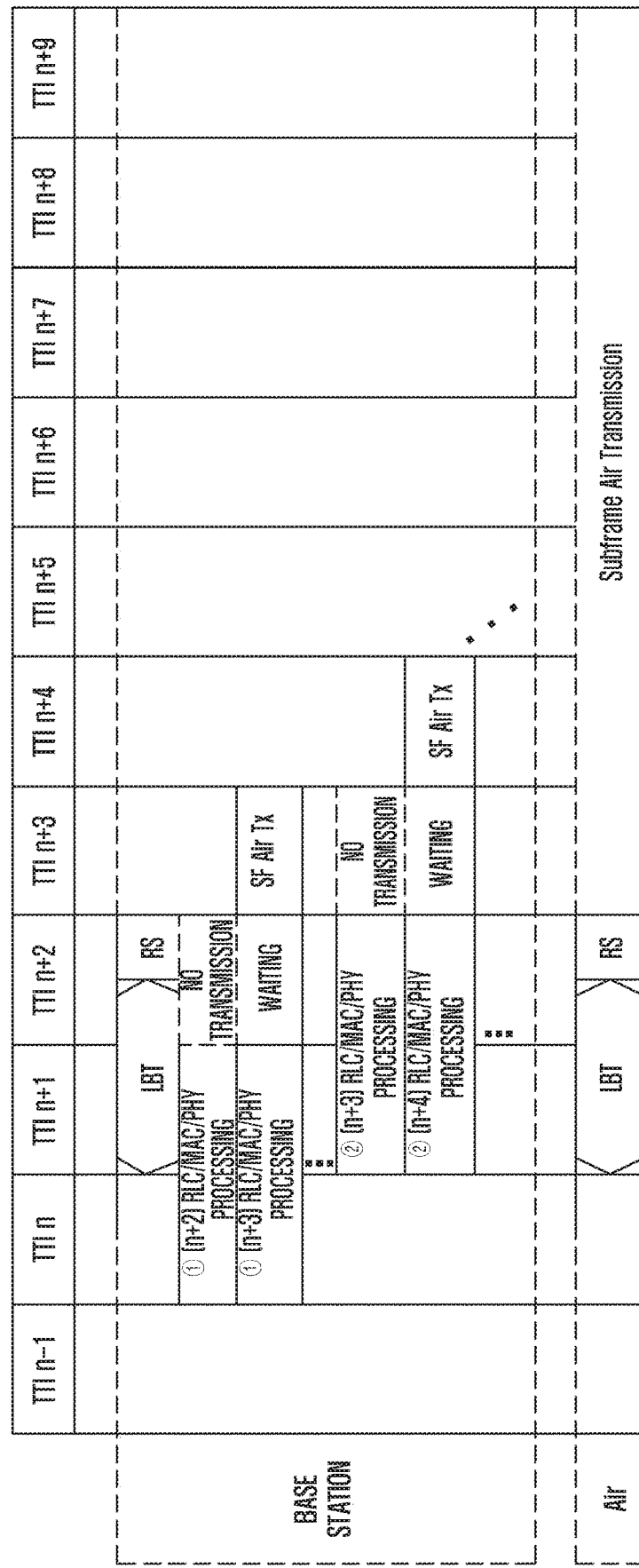
FIG. 5 depicts a packet transmission scheme in an unlicensed band according to embodiment 2-1 of the disclosure.

FIG. 5 depicts a packet transmission scheme in an unlicensed band according to embodiment 2-1 of the disclosure. Specifically, in embodiment 2-1, data packets corresponding to plural transmission times (TTIs) are generated at the same time to prepare for packet transmission failure due to the LBT delay.

As shown in FIG. 5, the base station can generate from TTI (n) a packet ① to be transmitted at TTI (n+2) and TTI (n+3).

If LBT operation starting from TTI (n+1) is delayed and the unlicensed frequency band is occupied from a specific point in the middle of TTI (n+2), to transmit a data packet on a subframe basis, the base station may transmit a reserved signal until TTI (n+2) ends.

Due to the LBT delay, the base station cannot transmit the packet ① corresponding to TTI (n+2). However, the base station can transmit the packet ① corresponding to TTI (n+3). Hence, the base station can transmit at TTI (n+3) the packet ① corresponding to TTI (n+3).

Meanwhile, in FIG. 5, the packet ① is generated from TTI (n) for transmission at TTI (n+2) and TTI (n+3). This is only an example, and the base station may further generate from TTI (n) the packet ① for transmission at plural TTIs after TTI (n+2).

The base station can generate from TTI (n+1) a packet ② to be transmitted at TTI (n+3) and TTI (n+4). However, as the packet ① corresponding to TTI (n+3) is transmitted at TTI (n+3), the packet ② to be transmitted at TTI (n+3) cannot be transmitted. Hence, the base station can transmit at TTI (n+4) the packet ② for transmission at TTI (n+4).

Meanwhile, in FIG. 5, the packet ② is generated from TTI (n+1) for transmission at TTI (n+3) and TTI (n+4). This is only an example, and the base station may further generate from TTI (n+1) the packet ② for transmission at plural TTIs after TTI (n+3).

By using the above-described scheme, the base station can transmit a data packet while minimizing the transmission time of a reserved signal depending on the LBT result.

Figure 6:
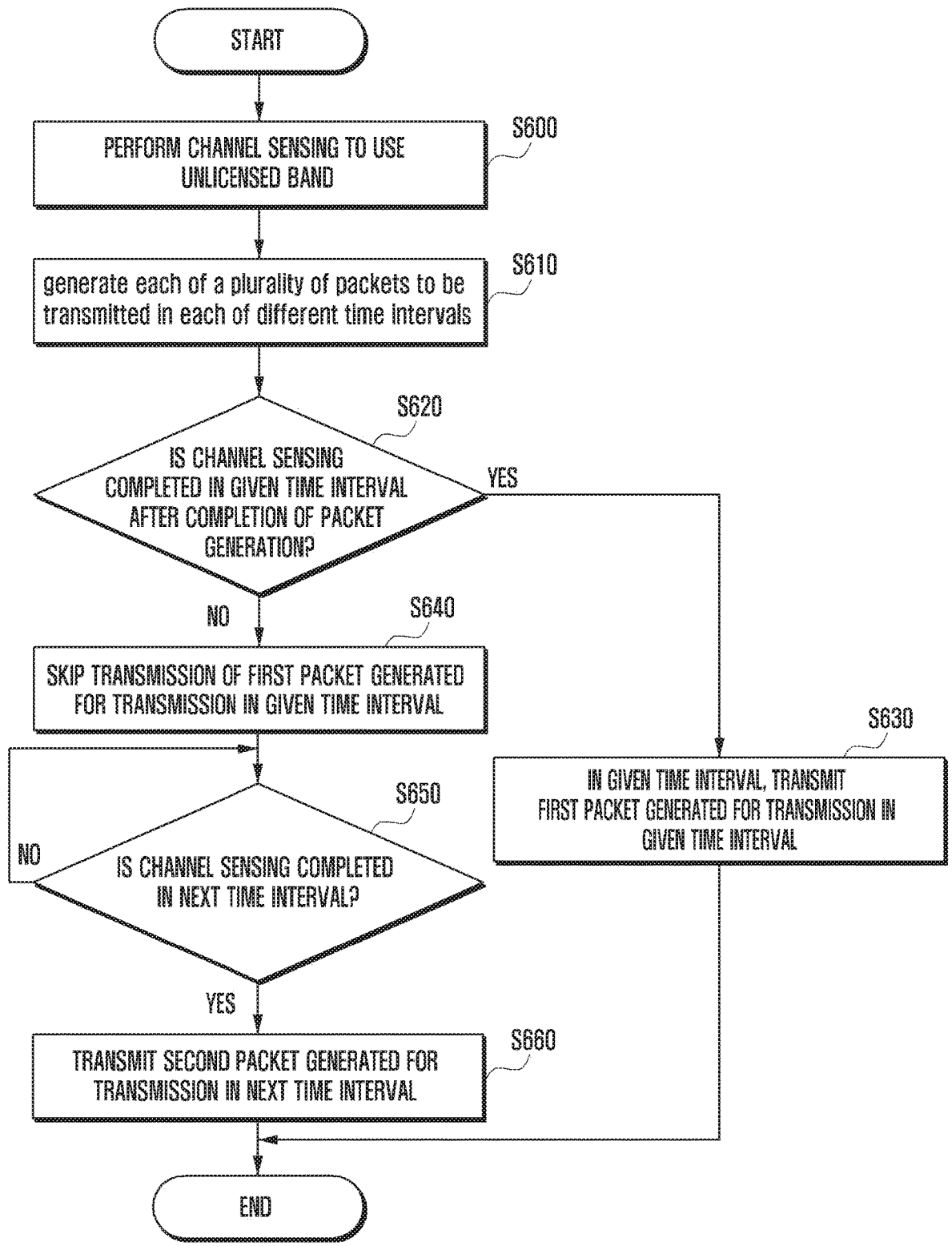
FIG. 6 is a flowchart of a packet transmission scheme in an unlicensed band according to embodiment 2-1 of the disclosure.

FIG. 6 is a flowchart of a packet transmission scheme in an unlicensed band according to embodiment 2-1 of the disclosure.

At step S600, the base station can perform channel sensing to use the unlicensed band. Channel sensing may be performed using LBT operation.

At step S610, the base station can generate a plurality of packets to be transmitted at different time intervals. For example, the base station may generate plural packets including the same data for transmission at different time intervals (TTIs).

At step S620, the base station can determine whether channel sensing is completed at a time interval immediately after completion of packet generation. For example, if a plurality of packets corresponding to TTIs (2) to (5) are generated until TTI (1), the base station may identify whether channel sensing is completed at TTI (2).

Upon determining that channel sensing is completed at the time interval, at step S630, the base station may transmit at the time interval the first packet generated for transmission at the time interval. For example, the base station may transmit at TTI (2) a packet corresponding to TTI (2) among the plurality of generated packets.

Upon determining that channel sensing is not completed at the time interval, at step S640, the base station may omit transmission of the first packet generated for transmission at the time interval. For example, the base station may omit transmission of the packet corresponding to TTI (2).

At step S650, the base station can determine whether channel sensing is completed at the next time interval. For example, the base station may identify whether channel sensing is completed at TTI (3).

Upon determining that channel sensing is completed at the next time interval, at step S660, the base station may transmit the second packet generated for transmission at the next time interval. For example, upon determining that channel sensing is completed at TTI (3), the base station may transmit the packet corresponding to TTI (3) among the plurality of generated packets.

Figure 7:
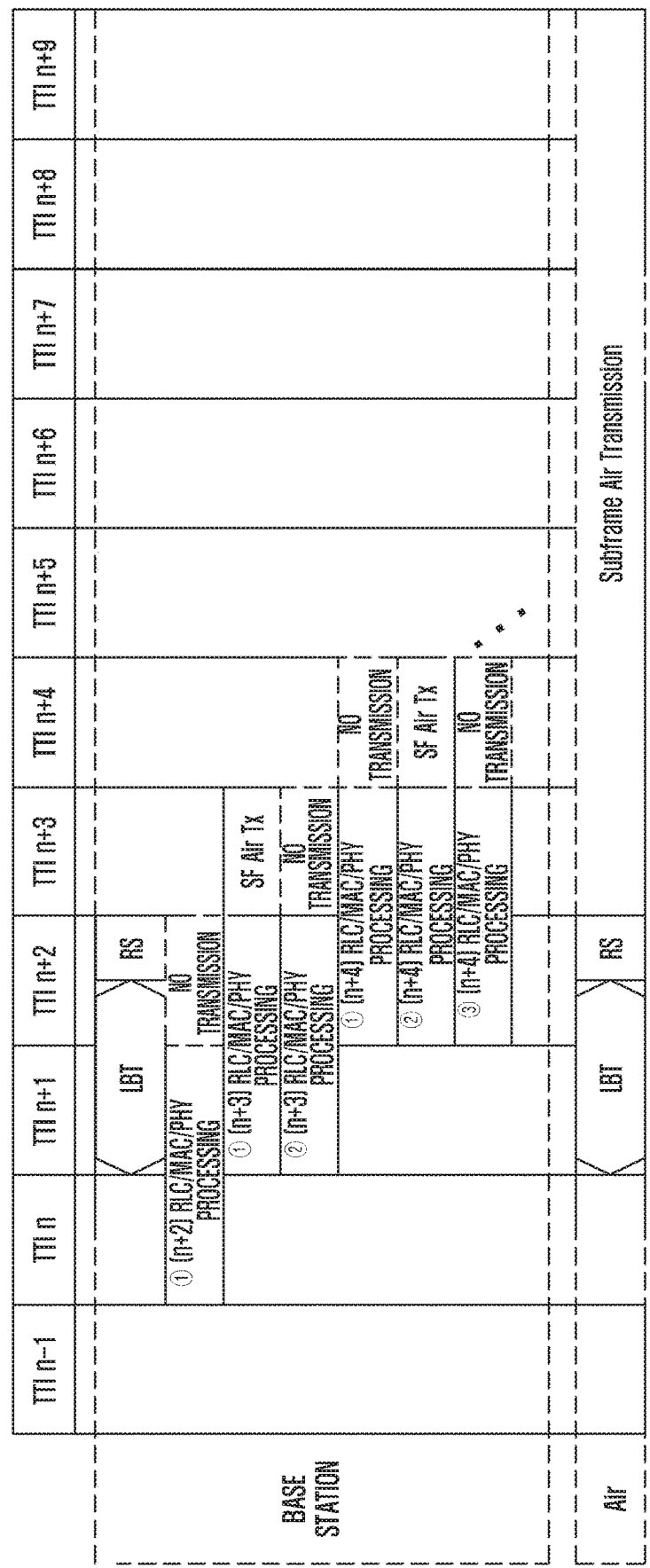
FIG. 7 depicts a packet transmission scheme in an unlicensed band according to embodiment 2-2 of the disclosure.

FIG. 7 depicts a packet transmission scheme in an unlicensed band according to embodiment 2-2 of the disclosure. In embodiment 2-2, the base station can generate a plurality of packets including the same data corresponding to different transmission intervals to prepare for the LBT delay.

As shown in FIG. 7, the base station can generate from TTI (n) a packet ① to be transmitted at TTI (n+2). The base station can generate from TTI (n+1) the packet ① and a packet ② for transmission at TTI (n+3). The base station can generate from TTI (n+2) the packet ①, packet ② and packet ③ for transmission at TTI (n+4).

If LBT operation starting from TTI (n+1) is delayed and the unlicensed frequency band is occupied from a specific point in the middle of TTI (n+2), to transmit a data packet on a subframe basis, the base station may transmit a reserved signal until TTI (n+2) ends.

Due to the LBT delay, the base station cannot transmit the packet ① generated corresponding to TTI (n+2). However, the base station can transmit the packet ① corresponding to TTI (n+3). Hence, the base station can transmit at TTI (n+3) the packet ① corresponding to TTI (n+3). However, the base station cannot transmit the packet ② generated corresponding to TTI (n+3).

Thereafter, as the packet ① is transmitted at TTI (n+3), the base station can generate from TTI (n+3) a packet ②, packet ③, and packet ④ for transmission at TTI (n+5).

Then, at TTI (n+4), the base station can transmit the packet ② corresponding to TTI (n+4). At TTI (n+5), the base station can transmit the packet ③ corresponding to TTI (n+5).

By using the above-described scheme, the base station can transmit a data packet while minimizing the transmission time of a reserved signal depending on the LBT result.

Figure 8:
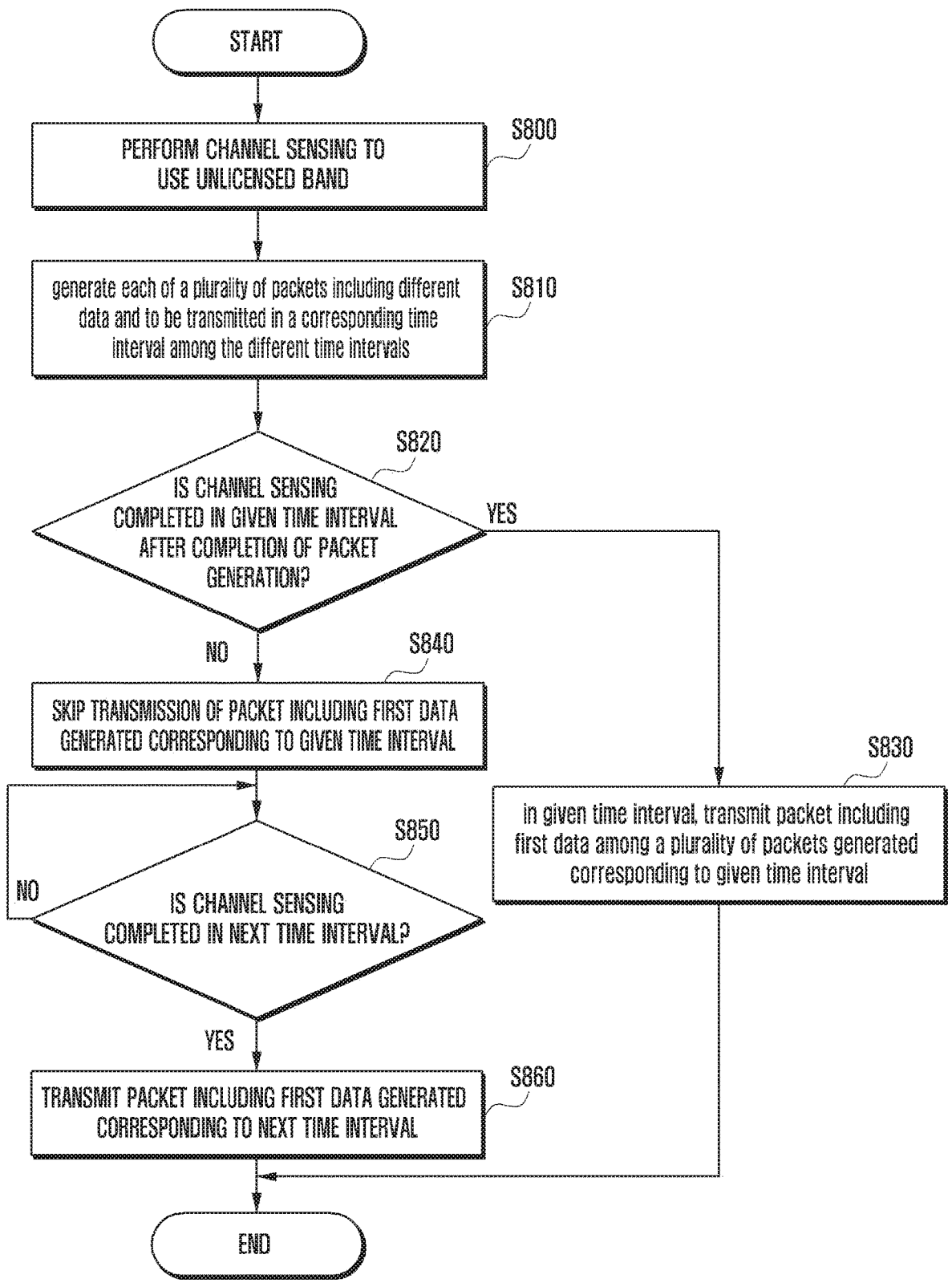
FIG. 8 is a flowchart of a packet transmission scheme in an unlicensed band according to embodiment 2-2 of the disclosure.

FIG. 8 is a flowchart of a packet transmission scheme in an unlicensed band according to embodiment 2-2 of the disclosure.

At step S800, the base station can perform channel sensing to use the unlicensed band. Channel sensing may be performed using LBT operation.

At step S810, the base station may generate plural packets including different data for transmission at a specific time interval. For example, the base station may generate multiple packets including different data (e.g., data 1 to data n) for transmission at a given time interval (e.g., TTI).

At step S820, the base station can determine whether channel sensing is completed at a time interval immediately after completion of packet generation. For example, if a plurality of packets with data 1 to data n are generated corresponding to a specific time interval, the base station may identify whether channel sensing is completed at the time interval.

Upon determining that channel sensing is completed at the time interval, at step S830, the base station may transmit at the time interval a packet including the first data among the plural packets generated corresponding to the time interval. For example, upon determining that channel sensing is completed at TTI (1), the base station may transmit a packet including the first data among the plural packets corresponding to TTI (1).

Upon determining that channel sensing is not completed at the time interval, at step S640, the base station may omit transmission of the packet including the first data generated corresponding to the time interval.

Thereafter, at step S850, the base station can determine whether channel sensing is completed at the next time interval.

Upon determining that channel sensing is completed at the next time interval, at step S860, the base station may transmit the packet including the first data generated corresponding to the next time interval. For example, upon determining that channel sensing is completed at TTI (2), the base station may transmit the packet corresponding to TTI (2) among the plurality of generated packets.

Figure 9:
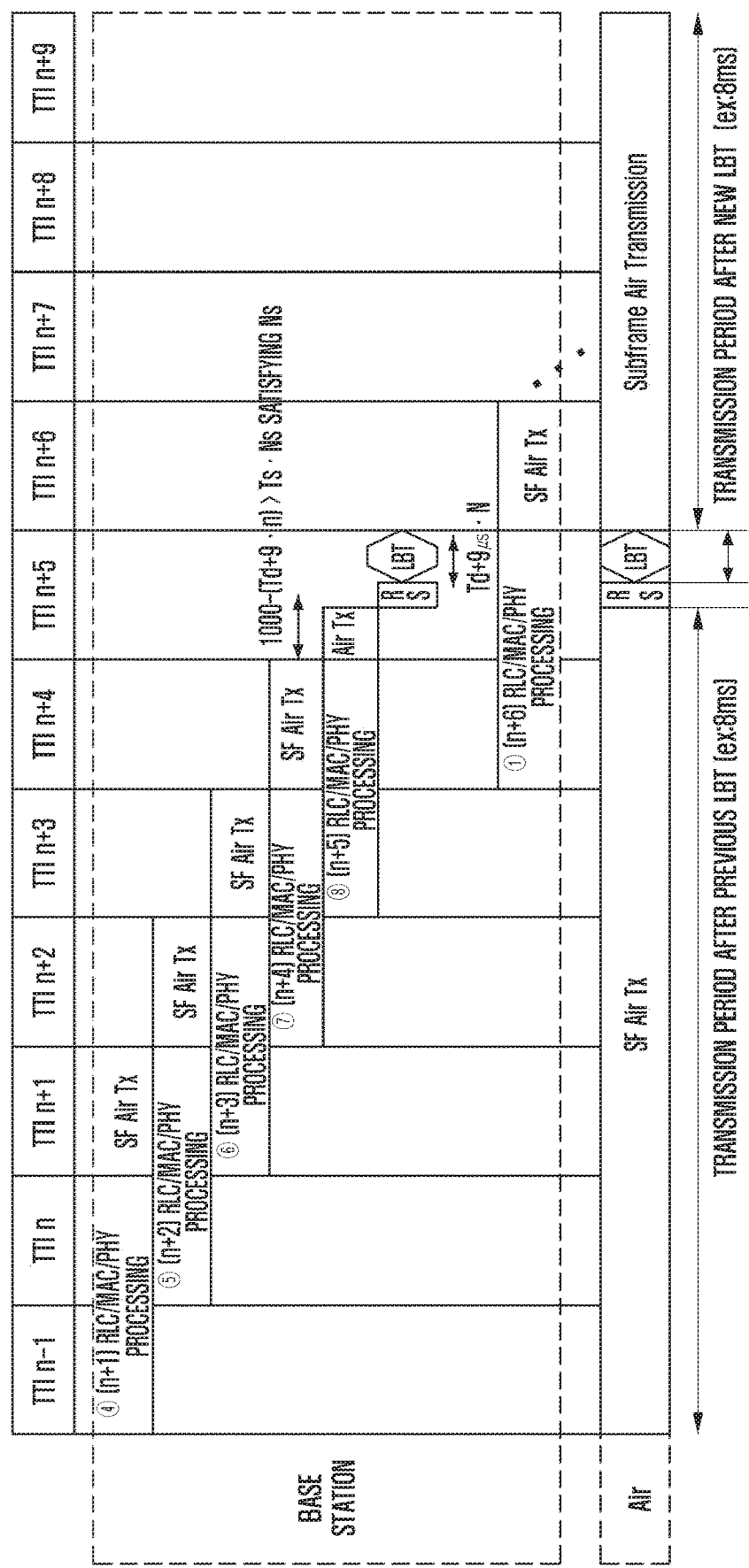
FIG. 9 depicts a packet transmission scheme in an unlicensed band according to embodiment 3-1 of the disclosure.

FIG. 9 depicts a packet transmission scheme in an unlicensed band according to embodiment 3-1 of the disclosure. In embodiment 3-1, the base station may generate a random backoff counter in advance (e.g., before 2 ms) to improve transmission efficiency. The random backoff counter is a constant for waiting for a random time to prevent collision between plural devices using the unlicensed band.

In this example, the maximum occupancy time of the unlicensed band is 8 ms, and frame structure type 3 is used. As shown in FIG. 9, the base station can generate packets in sequence before the maximum occupancy time expires and transmit the generated packet at the corresponding time interval.

The base station can generate the random backoff counter of the next transmission period in advance before the current transmission period expires. For example, the random backoff counter can be a random integer with a uniform distribution between 0 and $CW_p$. When the channel access priority P is 3, the allowed $CW_p$ size may be {15, 31, 63}. The allowed $CW_p$ size may be changed according to the HARQ result.

If the random backoff counter is N, the base station needs to perform channel sensing (e.g., LBT operation) for $T_d + N \times 9$ μs to occupy the next transmission period. When the channel access priority P is 3, $T_d$ may be 43 μs.

Hence, when frame structure type 3 is used, the base station may not transmit packets for a duration corresponding to a number of symbols including the channel sensing time ($T_d + N \times 9$ μs) for the next transmission period in the last subframe of the maximum occupancy time. In other words, the base station can transmit data packets for a duration corresponding to the number of symbols ($N_s$) satisfying Equation 1 in the last subframe.

$$1000 - (T_d + N \times 9 \text{ μs}) > T_s \cdot N_s \qquad \text{Equation 1}$$

In Equation 1, $T_d$ indicates a defer duration or defer period and is a randomly determined value between 25 to 79 μs according to the channel access priority. N is a random backoff counter as described above. $T_s$ is the length of one symbol and is, for example, $1000/14$ μs in a system transmitting data in the unlicensed band. $N_s$ may indicate the number of symbols scheduled by the base station for data transmission in the last subframe of the occupancy time.

For example, if the random backoff counter (N) is determined to be 5, the base station needs to perform LBT operation for 88 μs (43+5×9 μs). When 14 symbols are included in one subframe, the length of one symbol may be $1000/14$ μs (about 71.43 μs). Hence, the base station requires at least two symbols to perform LBT operation. The base station may transmit data packets through twelve symbols in the last subframe.

In FIG. 9, at TTI (n+5) being the last subframe of the current occupancy time, the base station may transmit data packets through twelve symbols, transmit a reserved signal through the remaining two symbols, and perform LBT operation for 88 μs (43+5×9μs).

Therefore, when the new occupancy period starts, the base station can utilize the maximum occupancy time.

Figure 10:
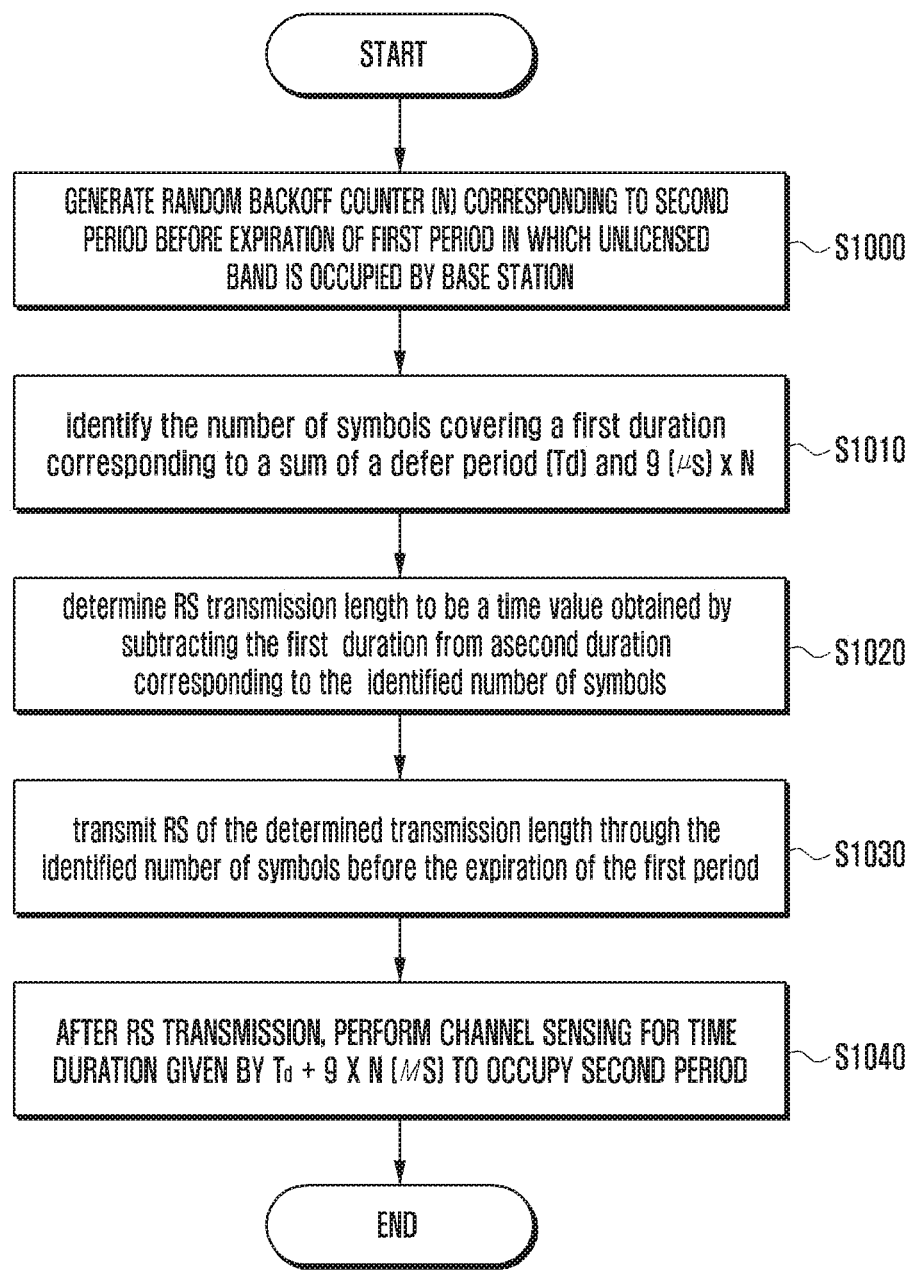
FIG. 10 is a flowchart of a packet transmission scheme in an unlicensed band according to embodiment 3-1 of the disclosure.

FIG. 10 is a flowchart of a packet transmission scheme in an unlicensed band according to embodiment 3-1 of the disclosure.

At step S1000, the base station may generate a random backoff counter (N) corresponding to the second period before the first period for occupying the unlicensed band expires.

At step S1010, the base station can identify the number of symbols corresponding to the time length given by $T_d+9 \times N$ (μs). At step S1020, the base station may determine the time length for transmitting a reserved signal (RS) by subtracting the time length given by $T_d+9 \times N$ (μs) from the time length corresponding to the number of the identified symbols.

At step S1030, the base station may transmit the RS for the determined time length through the identified number of symbols immediately before the first period expires. After RS transmission, at step S1040, the base station may perform channel sensing for the time length given by $T_d+9 \times N$ (μs) to occupy the second period.

Figure 11:
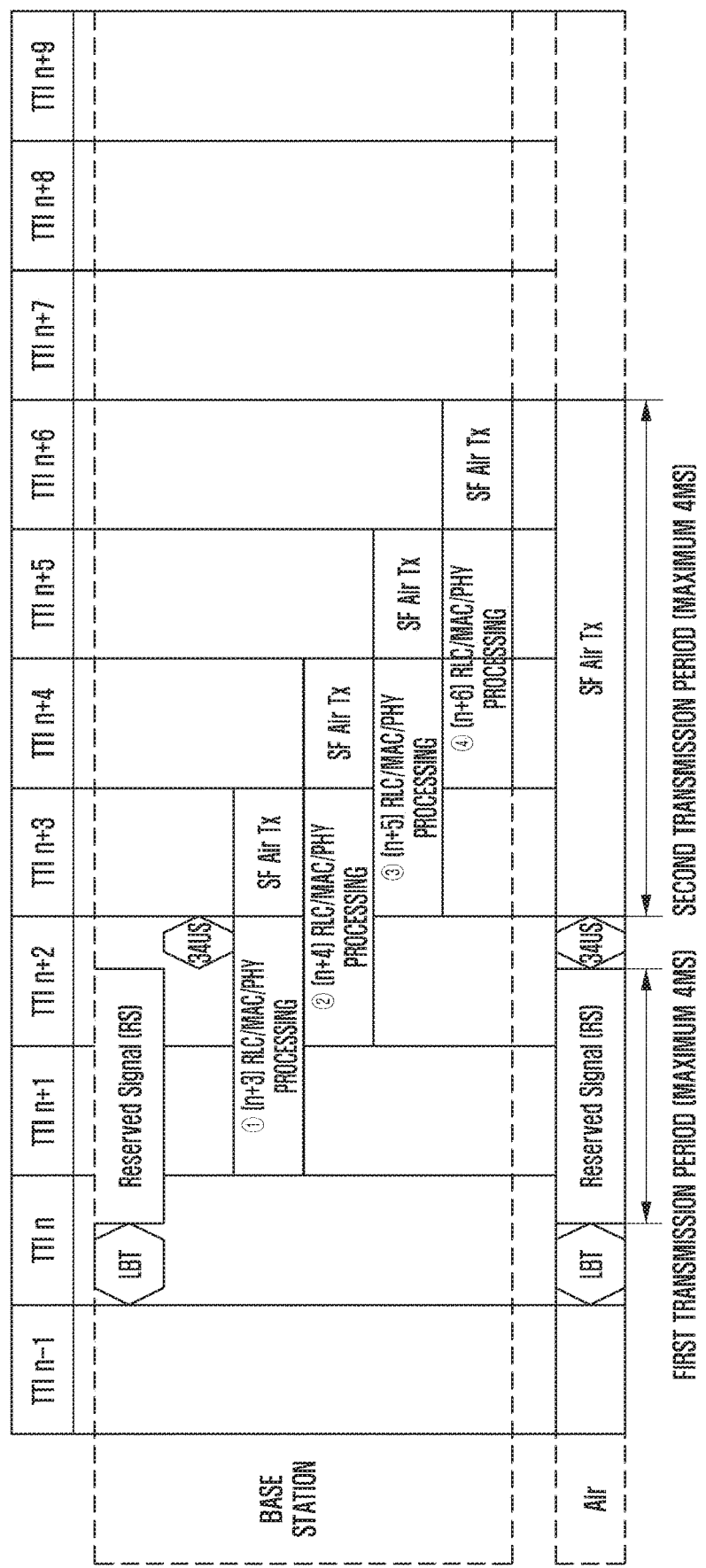
FIGS. 11 to 13 depict a packet transmission scheme in an unlicensed band according to embodiments 3-2 to 3-4 of the disclosure.
Figure 12:
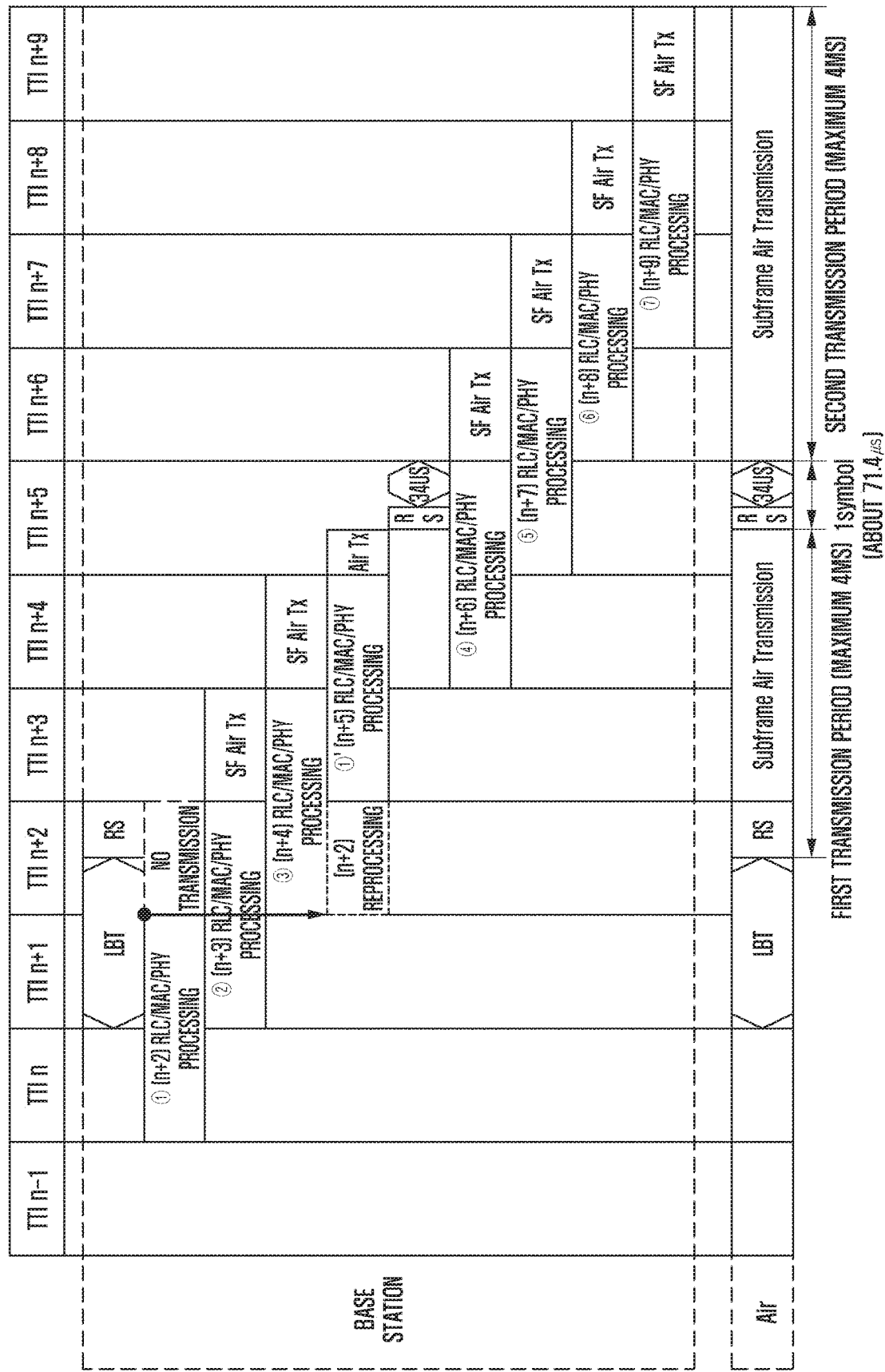
Figure 13:
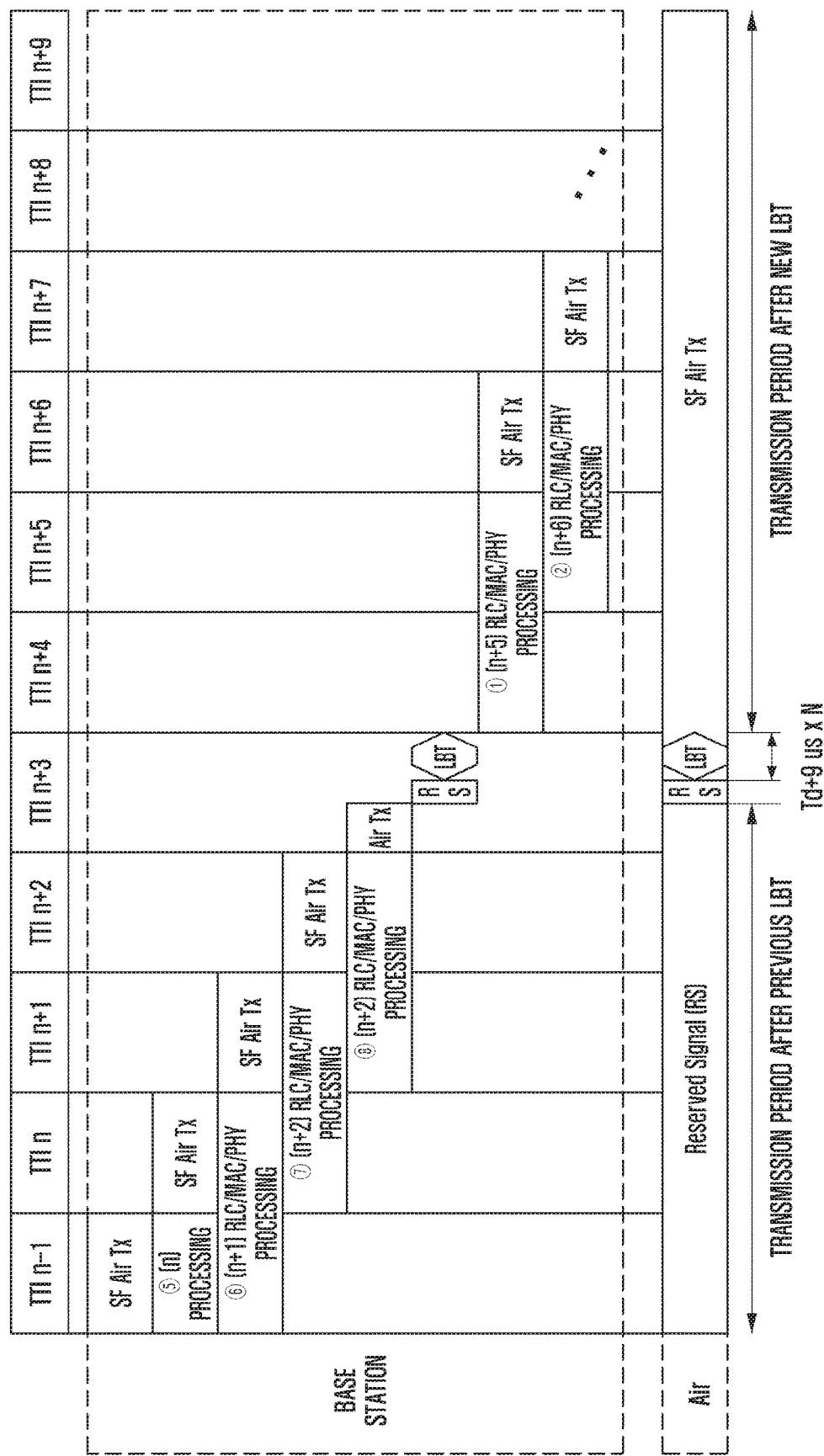

FIGS. 11 to 13 depict a packet transmission scheme in an unlicensed band according to embodiments 3-2 to 3-4 of the disclosure.

FIG. 11 depicts a packet transmission scheme of the base station when the maximum channel occupancy time $T_{mcot}$ is limited to 4 ms.

For example, in countries like Japan, it is prescribed to transmit for 4 ms after successful LBT operation and then transmit again for 4 ms if the channel is sensed to be idle for 34 μs. Here, if embodiment 3 described above is applied with some modification, the base station can transmit data without using one symbol of the subframe in the first period based on frame structure type 3. If the reserved signal is transmitted for about 37.4 μs of the one unused symbol (about 71.4 μs) and the channel is sensed to be idle for remaining 34 μs, the base station may occupy 4 ms in full in the second period.

FIG. 12 depicts a packet transmission scheme of the base station with simultaneous application of embodiment 1 and embodiment 3 described above.

The base station may generate from TTI (n) the packet ① to be transmitted at TTI (n+2). However, LBT operation starting at TTI (n+1) is delayed and the packet ① cannot be transmitted. Here, the base station can immediately know at TTI (n+2) that the packet ① cannot be transmitted due to the LBT delay. Hence, the base station can immediately initiate an ARQ or HARQ process to perform the retransmission procedure.

Specifically, the base station can generate from TTI (n) a packet ① to be transmitted at TTI (n+2). The base station can generate from TTI (n+1) a packet ② to be transmitted at TTI (n+3). The base station can generate from TTI (n+2) a packet ③ to be transmitted at TTI (n+4).

However, if LBT operation starting from TTI (n+1) is delayed and the unlicensed frequency band is occupied from a specific point in the middle of TTI (n+2), to transmit a data packet on a subframe basis, the base station may transmit a reserved signal until TTI (n+2) ends.

Hence, the base station cannot transmit the generated packet ① at TTI (n+2). In this case, upon determining that LBT operation is not completed at TTI (n+2), the base station can determine to initiate retransmission by using a feedback process associated with the corresponding packet. For example, upon determining that LBT operation is not completed at TTI (n+2), the base station can determine that a NACK signal has been received through a virtual feedback process from the terminal so as to initiate retransmission. As a result, the base station can reprocess the packet ① at TTI (n+2) and generate a packet ①' from TTI (n+3) so as to transmit the packet ① at TTI (n+5).

In addition, the base station can transmit at TTI (n+3) the packet ② generated for transmission at TTI (n+3), and transmit at TTI (n+4) the packet ③ generated for transmission at TTI (n+4). Then, the base station can transmit at TTI (n+5) the packet ①' generated for transmission at TTI (n+5).

However, if the maximum transmission period after successful LBT operation is 4 ms, the base station can transmit data without using one symbol of the subframe based on frame structure type 3. If the reserved signal is transmitted for about 37.4 μs of the one unused symbol (about 71.4 μs) and the channel is sensed to be idle for remaining 34 μs, the base station may occupy 4 ms in full in the second transmission period.

FIG. 13 depicts a variant of embodiment 3-1 described above when the maximum channel occupancy time $T_{mcot}$ is limited to 4 ms.

The base station may generate a random backoff counter in advance before the first period of 4 ms expires (e.g., before 2 ms).

FIG. 13 shows a case where the maximum channel occupancy time $T_{mcot}$ is 4 ms and frame structure type 3 is used. As shown in FIG. 13, the base station can generate packets in sequence before the maximum occupancy time expires and transmit the generated packets at the corresponding time interval.

The base station can generate the random backoff counter of the next transmission period in advance before the current transmission period expires. For example, the random backoff counter can be a random integer with a uniform distribution between 0 and $CW_p$. The allowed $CW_p$ size may be changed according to the HARQ result.

If the random backoff counter is N, the base station needs to perform channel sensing (e.g., LBT operation) for $T_d+N \times 9$ μs to occupy the next transmission period. The value of $T_d$ may be determined according to the channel access priority P.

Hence, when frame structure type 3 is used, the base station may not transmit packets for a duration corresponding to a number of symbols including the channel sensing time ($T_d$+N×9 μs) for the next transmission period in the last subframe of the maximum occupancy time.

For example, if the random backoff counter (N) is determined to be 5, the base station needs to perform LBT operation for 88 μs (43+5×9 μs). When 14 symbols are included in one subframe of 1 ms, the length of one symbol may be $1000/14$ μs (about 71.43 μs). Hence, the base station requires at least two symbols to perform LBT operation. The base station may transmit data packets through 12 symbols in the last subframe.

As shown in FIG. 13, at TTI (n+3) being the last subframe of the current transmission period, the base station may transmit data packets through 12 symbols, transmit a reserved signal through the remaining two symbols, and perform LBT operation for 88 μs (43+5×9 μs).

After LBT operation, the base station may generate and transmit data packets for the second transmission period of 4 ms.

Figure 14:
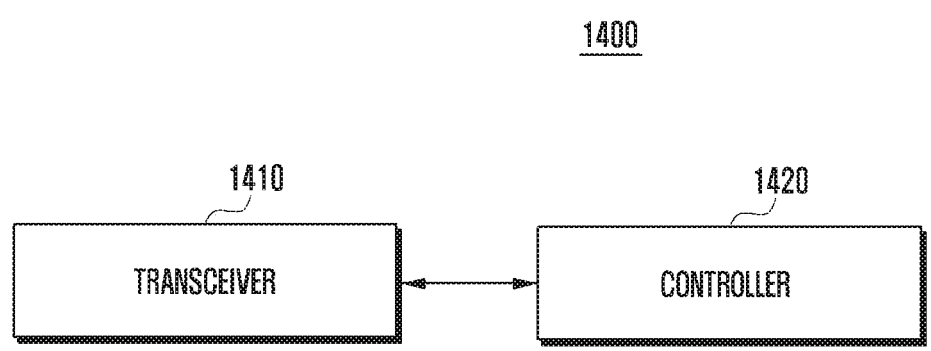
FIG. 14 is a block diagram of a device capable of transmitting data packets in an unlicensed band according to the control method of the disclosure.

FIG. 14 is a block diagram of a device 1400 capable of transmitting data packets in an unlicensed band according to the control method of the disclosure. The device 1400 may be, but not limited to, a base station that transmits data packets in the above-described embodiments. As shown in FIG. 14, the device 1400 may include a transceiver 1410 and a controller 1420.

The transceiver 1410 is a component for transmitting and receiving signals. The controller 1420 is a component for controlling the overall operation of the device 1400.

The controller 1420 may be a circuit, an application-specific integrated circuit (ASIC), or at least one processor.

The controller 1420 may generate a first packet including data to be transmitted to the terminal in the unlicensed band. When the generation of the first packet is completed, the controller 1420 may determine whether channel sensing for using the unlicensed band is completed. If channel sensing for using the unlicensed band is not completed, the controller 1420 may skip transmission of the first packet.

Determining whether channel sensing is completed may indicate determining whether LBT (listen-before-talk) operation for identifying whether the unlicensed band is occupied by another device is completed.

Specifically, upon determining that channel sensing for using the unlicensed band is not completed, the controller 1420 may initiate an ARQ/HARQ operation by assuming a virtual feedback process for the packet to be transmitted. For example, upon determining that LBT operation is not completed at TTI (n+2), the controller 1420 may determine to retransmit the corresponding packet via the virtual feedback process.

Here, determining to perform retransmission using a virtual feedback process may be, for example, assuming that the controller 1420 has received a NACK signal from the corresponding terminal in a virtual feedback process. As another example, the controller 1420 may determine that the virtual feedback process is in a state such as DTX (discontinuous transmission), NACK/DTX, or no transmission.

As such, the controller 1420 may determine that a NACK signal by a virtual feedback process has been received, and generate a second packet including the data.

In another embodiment, the controller 1420 may perform channel sensing for using the unlicensed band and may generate plural packets to be transmitted at different time intervals. The controller 1420 may determine a packet to be transmitted at a time interval immediately after packet generation among the plural packets based on whether channel sensing is completed.

For example, when channel sensing is not completed in a first time interval, the controller 1420 may skip transmission of the first packet generated corresponding to the first time interval.

When channel sensing is completed in a second time interval, the controller 1420 can transmit the second packet generated corresponding to the second time interval.

Here, the first packet and the second packet may include the same data and may be generated for transmission in different time intervals.

Meanwhile, the controller 1420 may generate a plurality of packets including different data and to be transmitted in a specific time interval. Here, the controller 1420 can determine a packet to be transmitted in the specific time interval after completion of channel sensing based on the transmission sequence of the plural packets.

In another embodiment, the controller 1420 may generate a random backoff counter (N) corresponding to the second period before the first period, in which the base station occupies the unlicensed band, expires. The controller 1420 may identify the number of symbols based on the random backoff counter. Based on the random backoff counter and the determined number of symbols, the controller 1420 may determine the transmission length for a reserved signal (RS) to be transmitted through the determined number of symbols. Through the determined number of symbols immediately before expiration of the first period, the controller 1420 may transmit the RS for the determined transmission length and perform channel sensing to occupy the second period.

Here, the controller 1420 may identify the number of symbols including or covering the length corresponding to the sum of the defer period ($T_d$) and 9(μs)×N (i.e., $T_d$+9×N (μ)), and may determine the RS transmission length to be the time value obtained by subtracting the sum of $T_d$ and 9(μs)×N from the time value corresponding to the identified number of symbols.

Through the device described above, the transmission efficiency in the unlicensed band can be improved and the user experience on the terminal can be improved.

The components of the device described above can be implemented in software. For example, the controller of the device may include a non-volatile memory such as a flash memory. The non-volatile memory may store a program for enabling the function of the controller.

In addition, the controller of the device may be implemented to include a CPU and a RAM (random access memory). The CPU of the controller may copy the above program stored in the non-volatile memory into the RAM, and then execute the copied program to perform the functions of the device as described above.

The controller is responsible for the control of the device. The term "controller" may be used interchangeably with the term "central processor", "microprocessor", "processor", or "operating system". Also, the controller may be implemented as a single-chip system (system-on-a-chip, SOC or SoC) together with other functional units such as a communication module included in the device.

Meanwhile, the control method of the device according to various embodiments described above can be coded as software and stored in a non-transitory readable medium. Such non-transitory readable media can be used in various devices.

A non-transitory readable medium is not a medium that stores data for a short period of time, such as a register, cache or memory, but a medium that semi-permanently stores data and is readable by an apparatus. Specifically, the non-transitory readable medium may be a CD, a DVD, a hard disk, a Blu-ray disk, a USB, a memory card, a ROM, or the like.

Hereinabove, various embodiments of the disclosure have been shown and described for the purpose of illustration without limiting the subject matter of the disclosure. It should be understood by those skilled in the art that many variations and modifications of the method and apparatus described herein will still fall within the spirit and scope of the disclosure as defined in the appended claims and their equivalents.

The invention claimed is:

1. A method performed by a base station, the method comprising:
generating a first packet including data to be transmitted to a terminal on an unlicensed band;
determining, after generation of the first packet, whether channel sensing for using the unlicensed band is completed;
skipping a transmission of the first packet, in case that the channel sensing for using the unlicensed band is ongoing;
determining to initiate a retransmission using a virtual feedback process associated with the first packet in case that the channel sensing for using the unlicensed band is ongoing; and
generating a second packet including the data in case that the channel sensing for using the unlicensed band is ongoing.

2. A method performed by a base station, the method comprising:
generating a plurality of packets, in a first time interval, to be transmitted in a time interval different from each other;
performing channel sensing to use an unlicensed band;
determining a first packet among the plurality of packets to be transmitted in a second time interval after the first time interval, based on whether channel sensing is completed;
skipping a transmission of a first packet in case that channel sensing is ongoing in the second time interval;
determining a second packet among the plurality of packets to be transmitted in a third time interval after the second time interval, based on whether channel sensing is completed; and
transmitting the second packet in the third time interval in case that channel sensing is completed in the second time interval,
wherein each of the plurality of packets includes same data.

3. The method of claim 2,
wherein generating a plurality of packets comprises generating each of a plurality of packets including different data and to be transmitted in a corresponding time interval among different time intervals; and
wherein determining a packet among a plurality of packets to be transmitted comprises determining a packet to be transmitted based on a transmission order of the plurality of packets, in the corresponding time interval after a completion of the channel sensing.

4. A method performed by a base station, the method comprising:
generating, before an expiration of a first period in which the base station occupies an unlicensed band, a random backoff counter (N) corresponding to a second period;
identifying a number of symbols based on the random backoff counter;
determining a transmission length for a reserved signal (RS) to be transmitted based on the random backoff counter and the identified number of symbols; and
transmitting, through the identified number of symbols before the expiration of the first period, the RS of the determined transmission length, and performing channel sensing to occupy the second period.

5. The method of claim 4,
wherein identifying a number of symbols comprises identifying the number of symbols covering a first duration corresponding to a sum of a defer period (Td) and 9 (μs)×N; and
wherein determining a transmission length for a reserved signal comprises determining the RS transmission length to be a time value obtained by subtracting the first duration from a second duration corresponding to the identified number of symbols.

6. A base station, comprising:
a transceiver configured to transmit and receive signals; and
a controller configured to:
generate a first packet including data to be transmitted to a terminal on an unlicensed band,
determine, after generation of the first packet, whether channel sensing for using the unlicensed band is completed,
skip a transmission of the first packet, in case that the channel sensing for using the unlicensed band is ongoing,
determine to initiate a retransmission using a virtual feedback process associated with the first packet in case that the channel sensing for using the unlicensed band is ongoing, and
generate a second packet including the data in case that the channel sensing for using the unlicensed band is ongoing.

7. A base station, comprising:
a transceiver configured to transmit and receive signals; and
a controller configured to:
generate a plurality of packets in a first time interval to be transmitted in a time interval different from each other,
perform channel sensing to use an unlicensed band,
determine a first packet among the plurality of packets to be transmitted in a second time interval after the first time interval, based on whether channel sensing is completed,
skip a transmission of a first packet in case that channel sensing is ongoing in the second time interval,
determine a second packet among the plurality of packets to be transmitted in a third time interval after the second time interval, based on whether channel sensing is completed, and
transmit the second packet in the third time interval in case that channel sensing is completed in the second time interval,
wherein each of the plurality of packets includes same data.

8. The base station of claim 7, wherein the controller is further configured to:
generate each of a plurality of packets including different data and to be transmitted in a corresponding time interval among different time intervals, and determine a packet to be transmitted based on a transmission order of the plurality of packets, in the corresponding time interval after a completion of the channel sensing.

9. A base station comprising:
a transceiver configured to transmit and receive signals; and
a controller configured to:
generate, before an expiration of a first period in which the base station occupies an unlicensed band, a random backoff counter (N) corresponding to a second period,
identify a number of symbols based on the random backoff counter,
determine a transmission length for a reserved signal (RS) to be transmitted based on the random backoff counter and the identified number of symbols, and
transmit, through the identified number of symbols before the expiration of the first period, the RS of the determined transmission length, and perform channel sensing to occupy the second period.

10. The base station of claim 9, wherein the controller is further configured to:
identify a number of symbols covering a first duration corresponding to a sum of a defer period (Td) and 9 (μs)×N, and
determine the RS transmission length to be a time value obtained by subtracting the first duration from a second duration corresponding to the identified number of symbols.

* * * * *